United States Patent
Ishiji et al.

(10) Patent No.: US 10,084,203 B2
(45) Date of Patent: Sep. 25, 2018

(54) NON-AQUEOUS SECONDARY BATTERY AND NON-AQUEOUS LIQUID ELECTROLYTE FOR SECONDARY BATTERY

(71) Applicant: FUJIFILM CORPORATION, Minato-ku, Tokyo (JP)

(72) Inventors: Yohei Ishiji, Kanagawa (JP); Michio Ono, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 567 days.

(21) Appl. No.: 14/541,674

(22) Filed: Nov. 14, 2014

(65) Prior Publication Data

US 2015/0072225 A1    Mar. 12, 2015

Related U.S. Application Data

(63) Continuation of application No. PCT/JP2013/063567, filed on May 15, 2013.

(30) Foreign Application Priority Data

May 16, 2012  (JP) ................................ 2012-112750
Jun. 26, 2012  (JP) ................................ 2012-143559
Jan. 31, 2013  (JP) ................................ 2013-017276

(51) Int. Cl.
*H01M 10/0567*    (2010.01)
*H01M 4/505*    (2010.01)
(Continued)

(52) U.S. Cl.
CPC ....... *H01M 10/0567* (2013.01); *H01M 4/505* (2013.01); *H01M 4/525* (2013.01); *H01M 10/052* (2013.01); *H01M 4/5825* (2013.01)

(58) Field of Classification Search
CPC ..................... H01M 10/0567; H01M 10/0525
See application file for complete search history.

(56) References Cited

U.S. PATENT DOCUMENTS 4,547,439 A    10/1985    Genies
4,857,423 A *  8/1989    Abraham ................ H01M 4/36
                                                        252/62.2
(Continued)

FOREIGN PATENT DOCUMENTS

CN    101343732 A    1/2009
JP    59-60967 A     4/1984
(Continued)

OTHER PUBLICATIONS

Communication dated Aug. 24, 2016, from the State Intellectual Property Office of People's Republic of China in counterpart Application No. 201380024427.9.
(Continued)

*Primary Examiner* — Karie O'Neill Apicella
(74) *Attorney, Agent, or Firm* — Sughrue Mion, PLLC

(57) ABSTRACT

A non-aqueous secondary battery containing: a positive electrode containing a transition metal oxide as an active material thereof; a negative electrode; and a non-aqueous liquid electrolyte containing an electrolyte, an organic solvent, and less than 0.1 mol/L of an organometallic compound containing a transition element or a rare-earth element as a central metal thereof.

10 Claims, 3 Drawing Sheets

(51) Int. Cl.
    *H01M 4/525*     (2010.01)
    *H01M 10/052*     (2010.01)
    *H01M 4/58*     (2010.01)

(56) References Cited

U.S. PATENT DOCUMENTS

2003/0175595 A1*   9/2003   Park ............... H01M 10/0567
                                                429/326
2007/0178370 A1*   8/2007   Amine ............. H01M 4/1391
                                                429/105
2008/0254218 A1*   10/2008   Lei ..................... C23C 16/16
                                                427/248.1

FOREIGN PATENT DOCUMENTS

| JP | 1-206571 A | 8/1989 |
|---|---|---|
| JP | 11-214009 A | 8/1999 |
| JP | 2000-251932 A | 9/2000 |
| JP | 2003-31259 A | 1/2003 |
| JP | 2003-151621 A | 5/2003 |
| JP | 3787923 B2 | 6/2006 |
| JP | 2008-538448 A | 10/2008 |
| JP | 2009-238945 A | 10/2009 |
| JP | 2009-290116 A | 12/2009 |

OTHER PUBLICATIONS

International Search Report of PCT/JP2013/063567, dated Aug. 20, 2013. [PCT/ISA/210].
Communication dated Mar. 15, 2017 from the State Intellectual Property Office of the P.R.C. in counterpart application No. 201380024427.9.

* cited by examiner

{Fig. 1}
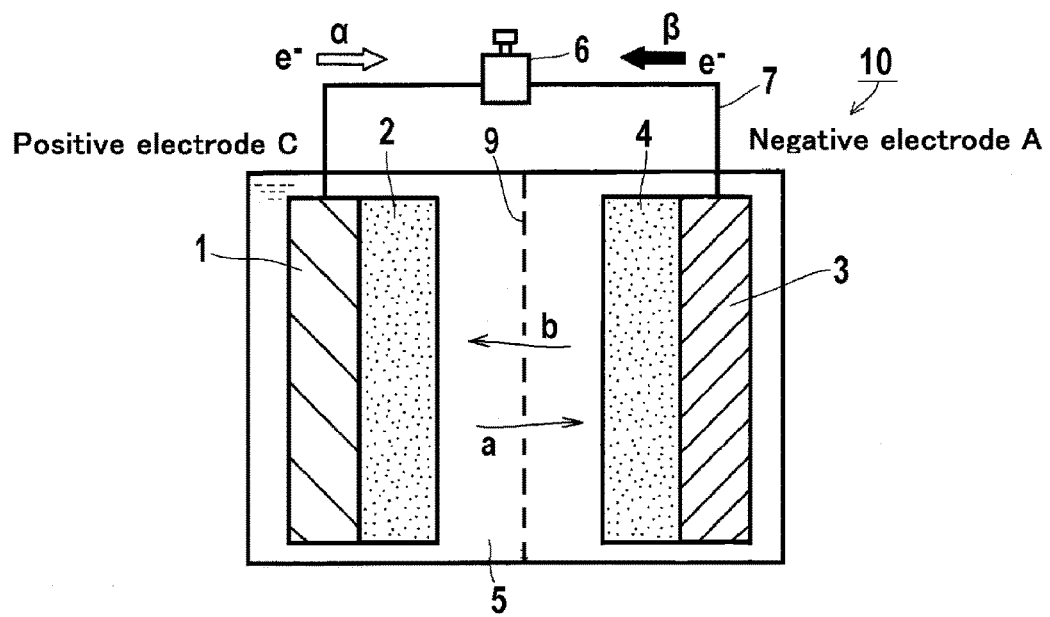

{Fig. 2}
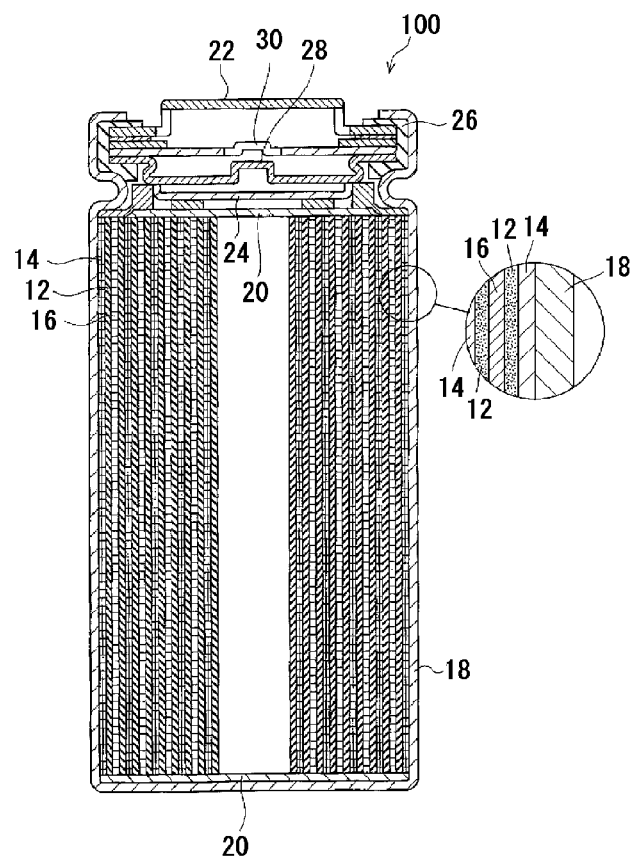

{Fig. 3}
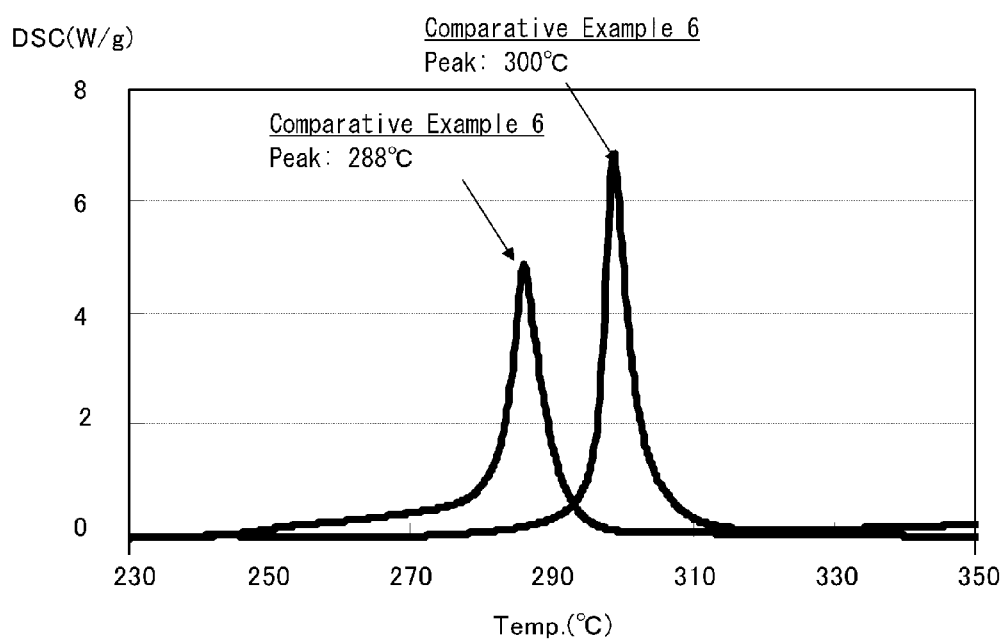

NON-AQUEOUS SECONDARY BATTERY AND NON-AQUEOUS LIQUID ELECTROLYTE FOR SECONDARY BATTERY

CROSS-REFERENCE TO RELATED APPLICATIONS

This application is a Continuation of PCT International Application No. PCT/JP2013/063567 filed on May 15, 2013, which claims priority under 35 U.S.C. § 119 (a) to Japanese Patent Application No. 2012-112750 filed on May 16, 2012, Japanese Patent Application No. 2012-143559 filed on Jun. 26, 2012, and Japanese Patent Application No. 2013-017276 filed on Jan. 31, 2013. Each of the above applications is hereby expressly incorporated by reference, in its entirety, into the present application.

FIELD OF THE INVENTION

The present invention relates to a non-aqueous secondary battery and a non-aqueous liquid electrolyte for a secondary battery.

BACKGROUND OF THE INVENTION

Secondary batteries called lithium ion batteries are currently attracting attention. They can broadly be classified into two categories of so called lithium ION secondary batteries and lithium METAL secondary batteries. The lithium METAL secondary batteries utilize precipitation and dissolution of lithium for the operation. Besides, the lithium ION secondary batteries utilize storage and release of lithium in the charge-discharge reaction. These batteries both can realize charge-discharge at large energy densities as compared with lead batteries or nickel-cadmium batteries. By making use of this characteristic, in recent years, these batteries have been widely applied to portable electronic equipment such as camera-integrated VTR's (video tape recorders), mobile telephones, and notebook computers. So as to respond to further expansion of applications as to a power source of the portable electronic equipment, the development has been continually progressed to provide lightweight secondary batteries with higher energy densities. Nonetheless, there exists a strong demand for size reduction, service life prolongation, and safety enhancement.

Regarding a liquid electrolyte to be used in lithium ion secondary batteries or lithium metal secondary batteries (hereinafter, these may be collectively referred to simply as a lithium secondary battery), a particular combination of materials has widely been employed in order to realize high electric conductivity and potential stability. That is, a carbonic acid ester-based solvent like propylene carbonate or diethyl carbonate is employed, in combination with an electrolyte salt of lithium hexafluorophosphate or the like.

With respect to the composition of a liquid electrolyte, for the purpose of improving battery characteristics, technique is variedly proposed as to additives to be contained in a liquid electrolyte. For example, by the additives, it is proposed to form an oxidative polymerized film as a protective film (SEI: Surface Electrolyte Interface) on the negative electrode (see Patent Literatures 1 and 2). Besides, it is also attempted to form such a protective film in the positive electrode as revealed in Patent Literatures 3 and 4.

CITATION LIST

Patent Literatures

Patent Literature 1: JP-A-2003-151621 ("JP-A" means unexamined published Japanese patent application)
Patent Literature 2: JP-A-2003-031259
Patent Literature 3: Japanese Patent No. 3787923
Patent Literature 4: JP-T-2008-538448 ("JP-T" means searched and published International patent application)
Patent Literature 5: JP-A-01-206571

SUMMARY OF THE INVENTION

Problems that the Invention is to Solve

In view of the current situation in this technical field as mentioned above, the present inventors were in pursuit of investigation and research on ingredient and contents of a functional liquid electrolyte, particularly in order to improve performances of non-aqueous secondary batteries in which a positive electrode active material is composed of a particular material. The present invention thus addresses to the provision of a non-aqueous secondary battery in which a cycling characteristic and the like could have been improved, under the condition of a transition metal oxide being employed as the positive electrode active material, by the selection of additives to be contained in a liquid electrolyte and the tiny amount of blend thereof. Further, the present invention addresses to the provision of a non-aqueous liquid electrolyte which can be used in the non-aqueous secondary battery.

Means to Solve the Problem

It has specifically been known that a metallocene representatively including ferrocene is used as an additive for the non-aqueous secondary battery (the above-described Patent Literature 5). However, this is recognized as a redox shuttle agent, but it has not been known that this forms a positive electrode-protective film. As a result of in-depth consideration, the present inventors have nevertheless found that an oxide of a particular organometallic compound containing a transition element or a rare-earth element as a central metal can considerably react on the positive electrode surface, containing a particular active material, thereby to exhibit an effect brought by which a protective film may supposedly be formed on the surface thereof. The present invention was made on the basis of such technical findings.

The above-described problems of the present invention were solved by the following means.

[1] A non-aqueous secondary battery containing:
a positive electrode containing a transition metal oxide as an active material thereof;
a negative electrode; and
a non-aqueous liquid electrolyte containing an electrolyte, an organic solvent, and less than 0.1 mol/L of an organometallic compound containing a transition element or a rare-earth element as a central metal thereof.

[2] The non-aqueous secondary battery described in item [1], wherein the positive electrode active material is a lithium-containing transition metal oxide.

[3] The non-aqueous secondary battery described in item [1] or [2], wherein the organometallic compound is a compound represented by formula (I) or a compound having a partial structure represented by formula (II):

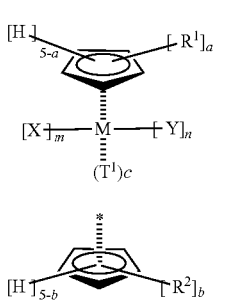

(I)

(CP)

wherein M represents a transition element or a rare-earth element;

R¹ represents an alkyl group, an alkylsilyl group, an alkenyl group, an alkynyl group, an alkoxy group, a thioalkoxy group, an amino group, an amide group, an acyloxy group, a cyano group, a carboxyl group, a group containing a carbonyl group, a group containing a sulfonyl group, a phosphinyl group, or a halogen atom; R¹ may form an aliphatic ring or an aromatic ring;

a represents an integer from 0 to 5;

X and Y each independently represent a hydrogen atom, an alkyl group, an alkenyl group, an alkoxy group, an alkylamino group, a silylamino group, a sulfonic acid group, an isocyanate group (NCO), an isothiocyanate group (NCS), a sulfanyl group, a phosphinyl group, a group containing a carbonyl group, a halogen atom, an aryl group, or a heteroaryl group; or X and Y may be linked to each other;

m and n are integers satisfying $0 \leq m+n \leq 3$; c represents an integer from 0 to 2;

T¹ represents a hydrogen atom, an alkyl group, an alkenyl group, an alkoxy group, an alkylamino group, a silylamino group, a sulfonic acid group, an isocyanate group (NCO), an isothiocyanate group (NCS), a sulfanyl group, a phosphinyl group, a group containing a carbonyl group, a halogen atom, an aryl group, a heteroaryl group, or a group represented by formula (CP); R² in formula (CP) has the same meaning as that of R¹; the term "*" represents an atomic bonding which binds to M; b represents an integer from 0 to 5; and R¹ and R² may be linked to each other;

$$M-NR^3R^4 \quad \text{Formula (II)}$$

wherein M represents a transition element or a rare-earth element; R³ and R⁴ represent a hydrogen atom, an alkyl group, an alkenyl group, an alkynyl group, an aryl group, a heteroaryl group, an alkylsilyl group, or a halogen atom; and R³ and R⁴ may be linked to each other.

[4] The non-aqueous secondary battery described in any one of items [1] to [3], wherein the central metal in the organometallic compound is any of the transition elements belonging to Groups 4 to 8 of the Periodic Table or a lanthanoid.

[5] The non-aqueous secondary battery described in any one of items [1] to [4], wherein the organometallic compound is a transition metal metallocene.

[6] The non-aqueous secondary battery described in any one of items [3] to [5], wherein the compound represented by formula (I) is a compound represented by any one of formulas (Icp-1) to (Icp-3):

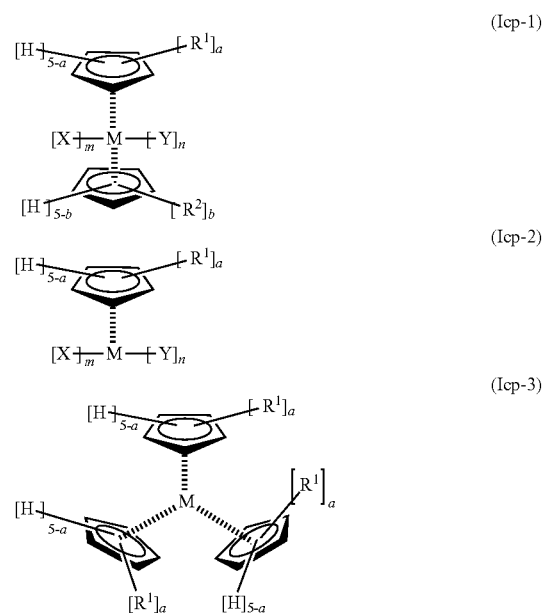

wherein M, R¹, R², a, b, X, Y, m and n have the same meanings as those of formula (I).

[7] The non-aqueous secondary battery described in item [6], wherein the compound represented by any one of formulas (Icp-1) to (Icp-3) is a compound represented by any one of formulas (Ia-1) to (Ia-3):

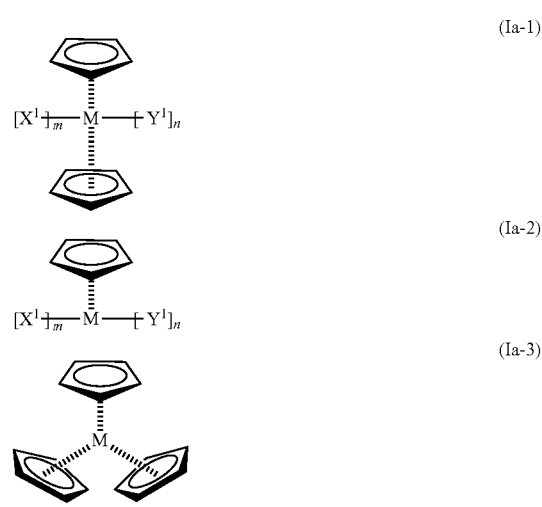

wherein X¹ and Y¹ each are a methyl group, a n-butyl group, a bis(trimethylsilyl)amino group, or an isothiocyanate group, or X¹ and Y¹ may be linked to each other to form a cyclic alkenyl group; and M, m and n have the same meanings as those in formula (I).

[8] The non-aqueous secondary battery described in item [7], wherein, in formula (Ia-1), m is 0 and n is 2; or wherein, in formula (Ia-2), m is 1 and n is 1.

[9] The non-aqueous secondary battery described in any one of items [3] to [5], wherein the compound having a partial structure represented by formula (II) is a compound represented by formula (IIa):

$$M\text{-}(NR^3R^4)_q \quad \text{Formula (IIa)}$$

wherein M, $R^3$ and $R^4$ have the same meanings as those in formula (II); and q represents an integer from 1 to 4.

[10] The non-aqueous secondary battery described in any one of items [1] to [9], wherein the liquid electrolyte contains at least one selected from the group consisting of an aromatic compound, a nitrile compound, a halogen-containing compound, a phosphorus-containing compound, a sulfur-containing compound, a silicon-containing compound, and a polymerizable compound.

[11] The non-aqueous secondary battery described in any one of items [1] to [10], wherein the positive electrode active material has a charge range in which the organometallic compound can be oxidized.

[12] The non-aqueous secondary battery described in any one of items [1] to [11], wherein the positive electrode active material is a transition metal oxide which is able to interpolate or release an alkaline metal ion.

[13] The non-aqueous secondary battery described in any one of items [1] to [12], wherein the material composed of the transition metal forming the positive electrode active material is a material containing $Li_gM3O_2$ (wherein M3 represents one or more of elements selected from Co, Ni, Fe, and Mn; and g represents from 0.02 to 1.2), or a material having a spinel structure represented by $Li_hM4_2O$ (wherein M4 represents Mn; and h represents from 0.02 to 2).

[14] The non-aqueous secondary battery described in any one of items [1] to [13], wherein the positive electrode active material is lithium cobalt oxide, lithium manganese oxide, lithium nickel oxide, lithium nickel manganese cobalt oxide, nickel-cobalt-aluminum, lithium manganese nickel oxide, or lithium iron phosphate.

[15] A non-aqueous liquid electrolyte for use in a non-aqueous secondary battery, the battery being provided with a positive electrode and a negative electrode, the positive electrode containing a material made of a transition metal oxide as an active material thereof;

the non-aqueous liquid electrolyte containing an electrolyte, an organic solvent, and less than 0.1 mol/L of an organometallic compound;

the organometallic compound containing a transition element or a rare-earth element as a central metal thereof.

[16] The non-aqueous liquid electrolyte for a secondary battery described in item [15], wherein the organometallic compound is a compound represented by formula (I):

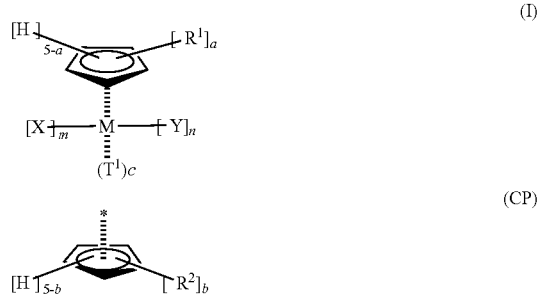

wherein M represents a transition element or a rare-earth element;

$R^1$ represents an alkyl group, an alkylsilyl group, an alkenyl group, an alkynyl group, an alkoxy group, a thio-alkoxy group, an amino group, an amide group, an acyloxy group, a cyano group, a carboxyl group, a group containing a carbonyl group, a group containing a sulfonyl group, a phosphinyl group, or a halogen atom; $R^1$ may form an aliphatic ring or an aromatic ring;

a represents an integer from 0 to 5;

X and Y each independently represent a hydrogen atom, an alkyl group, an alkenyl group, an alkoxy group, an alkylamino group, a silylamino group, a sulfonic acid group, an isocyanate group (NCO), an isothiocyanate group (NCS), a sulfanyl group, a phosphinyl group, a group containing a carbonyl group, a halogen atom, an aryl group, or a heteroaryl group; or X and Y may be linked to each other;

m and n are integers satisfying 0≤m+n≤3; c represents an integer from 0 to 2;

$T^1$ represents a hydrogen atom, an alkyl group, an alkenyl group, an alkoxy group, an alkylamino group, a silylamino group, a sulfonic acid group, an isocyanate group (NCO), an isothiocyanate group (NCS), a sulfanyl group, a phosphinyl group, a group containing a carbonyl group, a halogen atom, an aryl group, a heteroaryl group, or a group represented by formula (CP); $R^2$ in formula (CP) has the same meaning as that of $R^1$; the term "*" represents an atomic bonding which binds to M; b represents an integer from 0 to 5; and $R^1$ and $R^2$ may be linked to each other.

[17] The non-aqueous liquid electrolyte for a secondary battery described in item [15], wherein the organometallic compound is a compound having a partial structure represented by formula (II):

$$M\text{-}NR^3R^4 \quad \text{Formula (II)}$$

wherein M represents a transition element or a rare-earth element; $R^3$ and $R^4$ represent a hydrogen atom, an alkyl group, an alkenyl group, an alkynyl group, an aryl group, a heteroaryl group, an alkylsilyl group, or a halogen atom; and $R^3$ and $R^4$ may be linked to each other.

[18] The non-aqueous liquid electrolyte for a secondary battery described in any one of items [15] to [17], containing at least one selected from the group consisting of an aromatic compound, a nitrile compound, a halogen-containing compound, a phosphorus-containing compound, a sulfur-containing compound, a silicon-containing compound, and a polymerizable compound.

[19] An additive for a non-aqueous liquid electrolyte used for a non-aqueous secondary battery, the battery being provided with a positive electrode and a negative electrode, the positive electrode containing a material made of a transition metal oxide as an active material thereof, and the additive for a non-aqueous liquid electrolyte containing an organometallic compound containing a transition element or a rare-earth element as a central metal thereof.

[20] The additive described in item [19], wherein the organometallic compound is a compound represented by formula (I):

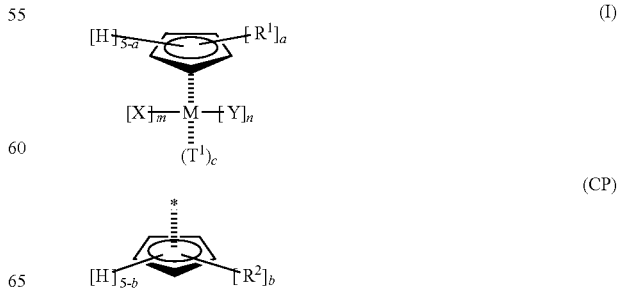

wherein M represents a transition element or a rare-earth element;

$R^1$ represents an alkyl group, an alkylsilyl group, an alkenyl group, an alkynyl group, an alkoxy group, a thioalkoxy group, an amino group, an amide group, an acyloxy group, a cyano group, a carboxyl group, a group containing a carbonyl group, a group containing a sulfonyl group, a phosphinyl group, or a halogen atom; $R^1$ may form an aliphatic ring or an aromatic ring;

a represents an integer from 0 to 5;

X and Y each independently represent a hydrogen atom, an alkyl group, an alkenyl group, an alkoxy group, an alkylamino group, a silylamino group, a sulfonic acid group, an isocyanate group (NCO), an isothiocyanate group (NCS), a sulfanyl group, a phosphinyl group, a group containing a carbonyl group, a halogen atom, an aryl group, or a heteroaryl group; or X and Y may be linked to each other;

m and n are integers satisfying $0 \leq m+n \leq 3$; c represents an integer from 0 to 2;

$T^1$ represents a hydrogen atom, an alkyl group, an alkenyl group, an alkoxy group, an alkylamino group, a silylamino group, a sulfonic acid group, an isocyanate group (NCO), an isothiocyanate group (NCS), a sulfanyl group, a phosphinyl group, a group containing a carbonyl group, a halogen atom, an aryl group, a heteroaryl group, or a group represented by formula (CP); $R^2$ in formula (CP) has the same meaning as that of $R^1$; the term "*" represents an atomic bonding which binds to M; b represents an integer from 0 to 5; and $R^1$ and $R^2$ may be linked to each other.

[21] The additive described in item [19], wherein the organometallic compound is a compound having a partial structure represented by formula (II):

$$M\text{-}NR^3R^4 \qquad \text{Formula (II)}$$

wherein M represents a transition element or a rare-earth element; $R^3$ and $R^4$ represent a hydrogen atom, an alkyl group, an alkenyl group, an alkynyl group, an aryl group, a heteroaryl group, an alkylsilyl group, or a halogen atom; and $R^3$ and $R^4$ may be linked to each other.

Effects of the Invention

According to the present invention, in a non-aqueous secondary battery containing a transition metal oxide as a positive electrode active material, cycling characteristics and, if necessary, stability of the positive electrode active material can be improved by the selection of additives to be contained in the liquid electrolyte and the tiny amount of blend thereof.

Further, according to the present invention, a desirable effect can be obtained by using a particular organometallic compound which is soluble in an organic solvent, and by dissolving it in the liquid electrolyte. The present invention can provide the situation not to necessitate cumbersome working processes such as formation of a positive electrode film made of a metal oxide or the like that is insoluble in the liquid electrolyte, and consequently can allow an effective production of the secondary battery. Further, the present invention may take a small addition amount of the high-priced organometallic compound, so that improvement in cycling characteristics and a cost saving can contemporaneously be realized.

Other and further features and advantages of the invention will appear more fully from the following description, appropriately referring to the accompanying drawings.

BRIEF DESCRIPTION OF THE DRAWINGS

FIG. 1 is a cross-sectional diagram illustrating a mechanism of a lithium ion secondary battery according to a preferable embodiment of the present invention, by modeling.

FIG. 2 is a cross-sectional diagram schematically illustrating a specific configuration of a lithium ion secondary battery according to a preferable embodiment of the present invention.

FIG. 3 shows results obtained by a DSC measurement of a positive electrode material ($LiNi_{1/3}Mn_{1/3}Co_{1/3}O_2$) processed by using 1-19.

MODE FOR CARRYING OUT THE INVENTION

The liquid electrolyte used in the non-aqueous secondary battery of the present invention contains a particular organometallic compound having a transition element or a rare-earth element as a central metal in an organic solvent. Hereinafter, preferable embodiments thereof are explained.

[Particular Organometallic Compound]

The particular organometallic compound suitably used in the present invention has a transition element or a rare-earth element as a central metal. Herein, the term "organometallic compound" means a collective term of the organic compound containing a metal, and means to include compounds having a bond between a metal and carbon as well as compounds having a bond between a metal and a nitrogen atom, a bond between a metal and an oxygen atom, a bond between a metal and a sulfur atom, or the like. Typically, the after-mentioned metallocenes and metal amides fall under the category thereof. On the other hand, by definition in a narrow sense, the organometallic compound can be interpreted as excluding an organometallic complex in which a metal binds through an ion-binding bond (for example, compounds which are formed by a metal-oxygen bond, such as a metal alkoxide and a metal acetylacetonato complex). However, an organic site which binds through the above-described ion-binding bond may be contained in the molecule of the organometallic compound.

The central metal in the particular organometallic compound is a transition element or a rare-earth element, and preferably the transition elements belonging to Groups 4 to 8 of the Periodic Table or lanthanoide. Specifically, the central metal includes the examples of M described below and a preferable range thereof is the same as that of M. As the above-described organometallic compound, those represented by the following formula (I) are more preferable, and a transition metal metallocene (a metal compound having one cyclopentadienyl group is also defined as a metallocene) is furthermore preferable.

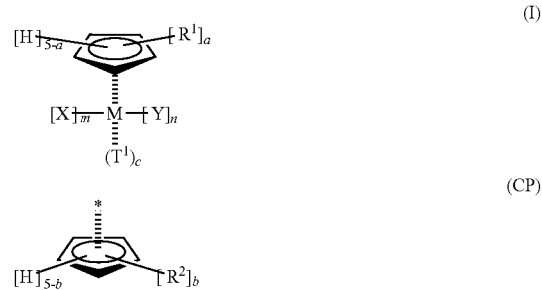

In formula (I), M represents a transition element or a rare-earth element. A preferable transition element is the transition elements belonging to Groups 4 to 8 of the Periodic Table or lanthanoide, and more preferably the transition elements belonging to Groups 4 to 6 of the Periodic Table or lanthanoide. Specifically, M is preferably Fe, Ru, Cr, V, Ta, Mo, Ti, Zr, Hf, Y, La, Ce, Sm, Nd, Lu, Er, Yb, or Gd; further preferably Ti, Zr, Hf, V, Nd, Fe, Er, or Gd; and most preferably Ti, Zr, Hf, V, or Er.

$R^1$ $R^1$ is an alkyl group (preferably having 1 to 6 carbon atoms, more preferably having 1 to 3 carbon atoms), an alkylsilyl group (preferably having 1 to 6 carbon atoms, more preferably having 1 to 3 carbon atoms), an alkenyl group (preferably having 2 to 6 carbon atoms, more preferably having 2 or 3 carbon atoms), an alkynyl group (preferably having 2 to 6 carbon atoms, more preferably having 2 or 3 carbon atoms), an alkoxy group (preferably having 1 to 6 carbon atoms, more preferably having 1 to 3 carbon atoms), a thioalkoxy group (preferably having 1 to 6 carbon atoms, more preferably having 1 to 3 carbon atoms), an amino group (preferably having 0 to 6 carbon atoms, more preferably having 1 to 4 carbon atoms), an amide group (a carbamoyl group) (preferably having 1 to 6 carbon atoms, more preferably having 1 to 3 carbon atoms), an acyloxy group (preferably having 1 to 6 carbon atoms, more preferably having 1 to 3 carbon atoms), a cyano group, a carboxyl group, a group containing a carbonyl group (Ra—CO—) (preferably having 2 to 7 carbon atoms, more preferably having 2 to 4 carbon atoms), a group containing a sulfonyl group (Ra—SO$_2$—), a phosphinyl group [PR$_2$—: R represents a hydrogen atom or an alkyl group] (preferably having 0 to 6 carbon atoms, more preferably having 1 to 3 carbon atoms), or a halogen atom. $R^1$ may form an aliphatic (saturated or unsaturated) ring or an aromatic ring.

Preferable examples of the above-described $R^1$ are within the range of the foregoing exemplified substituents and include examples of the substituent T described below. Among them, a methyl group, a n-butyl group, a t-butyl group, a trimethylsilyl group, a phosphine group (preferably having 2 to 6 carbon atoms, more preferably having 2 or 3 carbon atoms), and an alkylamino group (preferably having 2 to 6 carbon atoms, more preferably having 2 to 4 carbon atoms) are preferable. Ra represents a hydrogen group or a substituent. Preferred examples of the substituent include those exemplified as the substituent T described below. With respect to Ra, the same shall apply hereafter. Plural $R^1$'s may be bonded or condensed with each other to form a ring.

a a represents an integer from 0 to 5, preferably an integer from 0 to 4, and most preferably 0 or 1. In a case where a is two or more, a plurality of the group prescribed therein may be the same or different from one another.

X and Y

X and Y each independently represent a hydrogen atom, an alkyl group (preferably having 1 to 6 carbon atoms, more preferably having 1 to 3 carbon atoms), an alkenyl group (preferably having 2 to 6 carbon atoms, more preferably having 2 or 3 carbon atoms), an alkoxy group (preferably having 1 to 6 carbon atoms, more preferably having 1 to 3 carbon atoms), an alkylamino group (preferably having 2 to 10 carbon atoms, more preferably having 2 to 6 carbon atoms), a silylamino group (preferably having 0 to 10 carbon atoms, more preferably having 2 to 6 carbon atoms, and further preferably an alkylsilylamino group having the same number of carbon atoms), a sulfonic acid group, an isocyanate group (NCO), an isothiocyanate group (NCS), a sulfanyl group (a thioalkoxy group) (Ra—(S)n-) (preferably having 1 to 6 carbon atoms, more preferably having 1 to 3 carbon atoms, n represents an integer from 1 to 8), a phosphinyl group (RaO(Ra)PO—) (preferably having 0 to 10 carbon atoms, more preferably having 0 to 6 carbon atoms), a group containing a carbonyl group (Ra—CO—) (preferably having 1 to 6 carbon atoms, more preferably having 1 to 3 carbon atoms), a halogen atom, an aryl group (preferably having 6 to 22 carbon atoms, more preferably having 6 to 10 carbon atoms), or a heteroaryl group (preferably having 2 to 8 carbon atoms, more preferably having 2 to 4 carbon atoms). X and Y may form a ring individually, or may bind together or condense with each other to form a ring. For example, a plurality of sulfanyl groups may bind together to form a cyclic polysulfide which acts as a ligand. Among them, a methyl group, an n-butyl group, a dialkylamino group, a bis(trialkylsilyl)amino group, an isothiocyanate (NCS) group, and a cyclic alkenyl group which is formed by a combination of X and Y (butadiene coordination-type metallacycle) are preferable. X and Y may further have a substituent, and preferred examples thereof include those exemplified as the substituent T described below. As the group which is formed by a combination of X and Y, the following groups are preferable. (u represents an integer from 1 to 12).

$$*\!\!-\!\!(S)u\text{-}* \tag{XY1}$$

$$*\!\!-\!\!C\!\!=\!\!C\!\!-\!\!C\!\!=\!\!C\!\!-\!\!* \tag{XY2}$$

$$*\!\!-\!\!C\!\!=\!\!C\!\!-\!\!* \tag{XY3}$$

m and n m and n are integers which satisfies the expression: $0 \leq (m \text{ plus } n) \leq 3$. The m plus n are preferably 1 or more. When m or n is 2 or more, a plurality of groups prescribed therein may be the same or different from one another.

$T^1$ $T^1$ is a hydrogen atom, an alkyl group (preferably having 1 to 6 carbon atoms, more preferably having 1 to 3 carbon atoms), an alkenyl group (preferably having 2 to 6 carbon atoms, more preferably having 2 or 3 carbon atoms), an alkoxy group (preferably having 1 to 6 carbon atoms, more preferably having 1 to 3 carbon atoms), an alkylamino group (preferably having 1 to 10 carbon atoms, more preferably having 1 to 6 carbon atoms), a silylamino group (preferably having 1 to 10 carbon atoms, more preferably having 1 to 6 carbon atoms), a sulfonic acid group, an isocyanate group (NCO), an isothiocyanate group (NCS), a sulfanyl group (Ra—(S)u-), a phosphinyl group (RaO(Ra)PO—), a group containing a carbonyl group (Ra—CO—), a halogen atom, an aryl group (preferably having 6 to 22 carbon atoms, more preferably having 6 to 10 carbon atoms), a heteroaryl group (preferably having 2 to 8 carbon atoms, more preferably having 2 to 4 carbon atoms), or a group represented by formula (CP). Among these, a hydrogen atom, a methyl group, a n-butyl group, an alkylamino group (preferably having 1 to 6 carbon atoms), or a group represented by formula (CP) is preferable. $R^2$ in formula (CP) has the same meaning as that of $R^1$. The term "*" represents an atomic bonding which binds to a metal atom M. b represents an integer from 0 to 5. In a case where b is 2 or more, the groups prescribed therein may be the same or different from one another. $R^1$ and $R^2$ may be linked to each other.

When $T^1$ is an alkylamino group, $T^1$ is preferably an alkylamino group having 1 to 6 carbon atoms, more preferably a dimethyl amino group or a diethyl amino group.

c is an integer from 0 to 2. In a case where c is 2 or more, the groups prescribed therein may be the same or different from one another.

The compound represented by formula (I) is preferably a compound represented by any one of formulas (Icp-1) to (Icp-3).

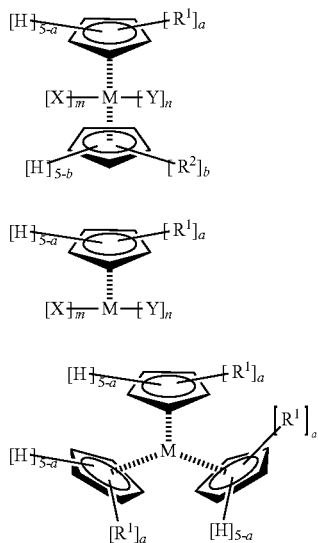

In formulas (Icp-1) to (Icp-3), M, $R^1$, $R^2$, a, b, X, Y, m and n have the same meanings as those in formula (I).

The compound represented by any one of formulas (Icp-1) to (Icp-3) is preferably a compound represented by any one of formulas (Ia-1) to (Ia-3), respectively.

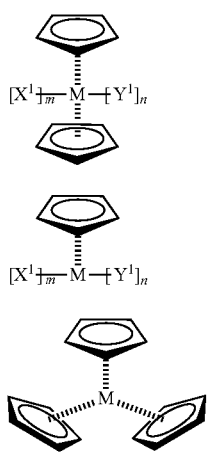

In formulas (Ia-1) to (Ia-3), $X^1$ and $Y^1$ have the same meaning as X and Y described above, respectively. $X^1$ and $Y^1$ each are preferably a methyl group, a n-butyl group, a bis(trimethylsilyl)amino group, or an isothiocyanate group. Alternatively, $X^1$ and $Y^1$ may be linked to each other to form a cyclic alkenyl group (butadiene coordination-type metallacycle). M, m and n have the same meanings as those in formula (I).

The organometallic compound is also preferably a compound having a partial structure represented by formula (II).

$$M\text{-}NR^3R^4 \qquad \text{Formula (II)}$$

In formula (II), M represents a transition element or a rare-earth element. Preferable examples thereof are the same as those in the above-described formula (I).

$R^3$ and $R^4$ represent a hydrogen atom, an alkyl group (preferably having 1 to 6 carbon atoms, more preferably having 1 to 3 carbon atoms), an alkenyl group (preferably having 2 to 6 carbon atoms, more preferably having 2 or 3 carbon atoms), an alkynyl group (preferably having 2 to 6 carbon atoms, more preferably having 2 or 3 carbon atoms), an aryl group (preferably having 6 to 22 carbon atoms, more preferably having 6 to 10 carbon atoms), a heteroaryl group (preferably having 2 to 6 carbon atoms, more preferably having 2 to 4 carbon atoms), an alkylsilyl group (preferably having 1 to 6 carbon atoms, more preferably having 1 to 3 carbon atoms), or a halogen atom. Alternatively, $R^3$ and $R^4$ may be linked to each other. $R^3$ and $R^4$ may be bonded or condensed with each other to form a ring. Preferred examples of $R^3$ and $R^4$ include those exemplified as the substituent T described below. Among these, a methyl group, an ethyl group and a trimethylsilyl group are preferable.

The compound represented by formula (II) is preferably a compound represented by formula (IIa).

$$M\text{-}(NR^3R^4)_q \qquad \text{Formula (IIa)}$$

In formula (IIa), M, $R^3$ and $R^4$ have the same meanings as those in formula (II), respectively. q represents an integer from 1 to 4, preferably an integer from 2 to 4, and further preferably 3 or 4. In a case where q is 2 or more, the groups prescribed therein may be the same or different from one another.

Herein, explanation is given about a presumptive mechanism of action which the above-described particular organometallic compound exerts improvement in cycling characteristics in the non-aqueous secondary battery according to a preferable embodiment of the present invention. However, the present invention is not construed in a limited way by this explanation.

Firstly, an action as a conventional redox shuttle is explained by taking ferrocene as an example. Ferrocene is subjected to oxidation and reduction in a liquid electrolyte, and changes reversibly to an oxide thereof there. Through this oxidation and reduction reaction, the oxide acts as a carrier of lithium ion ($Li^+$) at the time of overcharge of the battery, so that generation of failure due to the overcharge is suppressed. In contrast, in the preferable embodiment of the present invention, it is presumed that not a reversible reaction due to oxidation and reduction of ferrocene, but both a chemical adsorption and a decomposition reaction on the positive electrode surface are involved therein (especially, it is thought that the action becomes conspicuous in a high-potential positive electrode). That is, it is thought that a particular organometallic compound adsorbs on the negatively ($\delta^-$) charged site at the time of ordinary discharge-charge, in the surface or the like of the LMO (lithium manganese spinel oxide) which constitutes a positive electrode active material. It is presumed that some sort of reaction is made progress due to oxidation there, and a protective film (SEI) which is composed of the particular organometallic compound as a substrate is formed on the positive electrode surface whereby improvement in cycling characteristics has been realized.

In consideration of the foregoing reaction mechanism, it is thought that a very small amount of the particular organometallic compound is preferable, and therefore, instead of making the particular organometallic compound act as a redox shuttle, the particular organometallic compound acts as a material which is able to form a good protective film on the positive electrode surface, while maintaining effectively a discharge-charge cycle of the battery.

In the present invention, the above-described particular organometallic compound is contained in the non-aqueous liquid electrolyte in an amount of less than 0.1 mol/L, and preferably 0.05 mol/L or less. The present inventors have begun to understand that it is particularly effective to control the content of the organometallic compound to a very small amount. If defined strictly from such point of view, the content is more preferably less than 0.01 mol/L, and particularly preferably 0.005 mol/L or less. There is no particular lower limit thereof, but the content is preferably 0.00001 mol/L or more, and more preferably 0.0001 mol/L or more. Advantages that a good positive electrode protective film is formed by daring to set a content of the organometallic compound to such very small amount in this way without preventing discharge-charge of the battery is as described above.

Hereinafter, specific examples of the organometallic compound will be described, but the present invention is not limited to these. Herein, TMS represents a trimethylsilyl group.

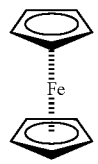

I-1

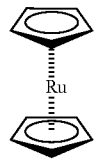

I-2

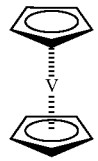

I-3

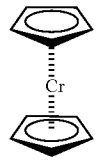

I-4

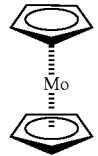

I-5

-continued

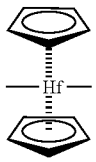

I-6

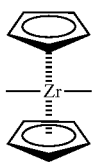

I-7

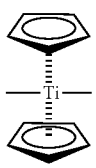

I-8

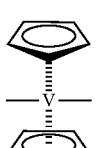

I-9

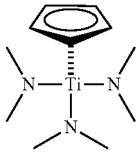

I-10

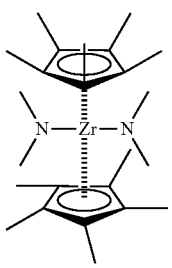

I-11

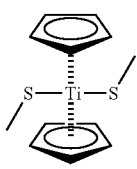

I-12

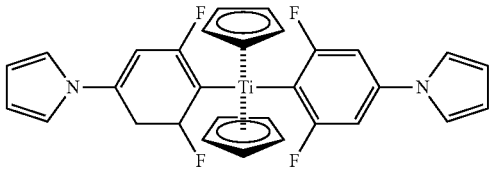

I-13

-continued
I-14
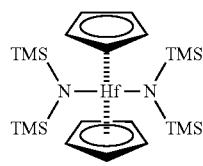
I-15
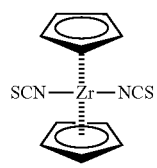
I-16
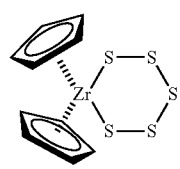
I-17
I-18
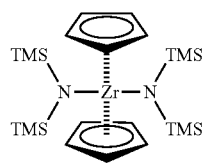
I-19
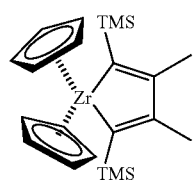
I-20
I-21
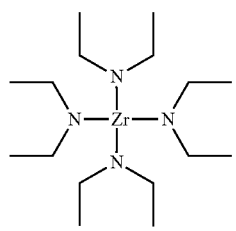
-continued
I-22
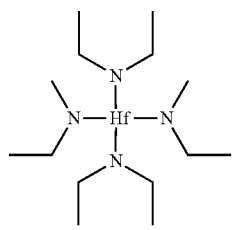
I-23
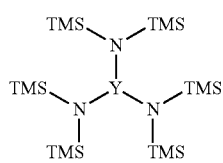
I-24
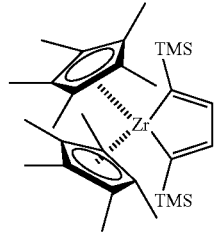
I-25
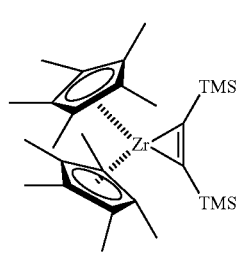
I-26
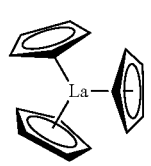
I-27
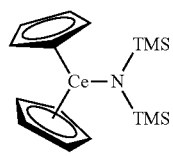
I-28
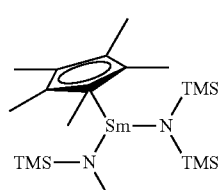
I-29
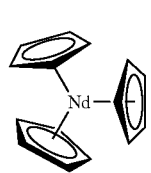

I-30 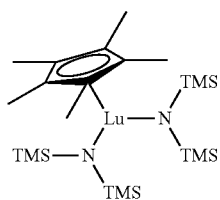

I-31 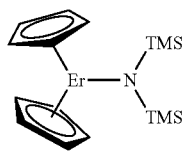

I-32 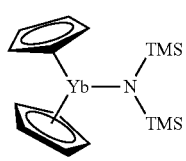

I-33 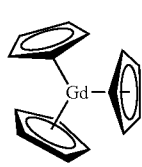

I-34 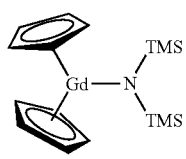

I-35 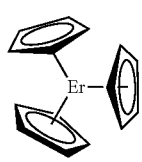

I-36 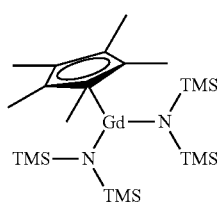

I-37 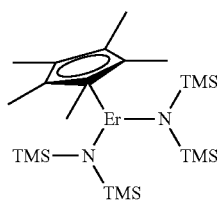

I-38 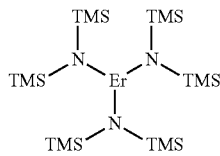

I-39 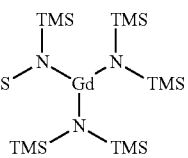

Oxidation potentials (defined as a peak potential at which a maximum electric current has flowed) measured by the measuring method described below are given below with respect to typical ones among the above-described exemplified compounds. In an embodiment of the present invention, it is preferable from the viewpoint of quickly forming SEI that a reaction occurs at a potential lower than that at which insertion and release of lithium ions from a positive electrode active material occur. From such point of view, the above-described organometallic compound is preferably those which react within a range from 3.5 to 4.2 V.

TABLE A

| No. | V |
|---|---|
| I-1 | 3.4 |
| I-2 | 3.8 |
| I-3 | 3.6 |
| I-4 | 3.7 |
| I-5 | 3.8 |
| I-6 | 4.5 |
| I-7 | 4.3 |
| I-8 | 4.1 |
| I-13 | 4.2 |
| I-15 | 4.3 |
| I-18 | 4.1 |
| I-19 | 3.5 |
| I-20 | 4.1 |
| I-25 | 3.8 |
| I-26 | 3.3 |
| I-31 | 3.2 |
| I-34 | 3.1 |
| I-37 | 3.2 |

With respect to specific measuring method and result of the oxidation potential, typically, in voltammogram when the electric potential of the above-mentioned range is swept, whether oxidized or not may be evaluated by whether a current peak of 0.1 mA/cm² or more in absolute value is shown or not. The measuring temperature is set at 25° C. At this time, the sample concentration is 0.01M, and the potential scan rate is 5 mV/s. This peak may be a broad one or the one having a shoulder, and may be evaluated and determined in the scope of exhibiting the effect of the present invention. Alternatively, the peak may be evaluated while subtracting a base line of a chart.

Examples of the substituent T which may be included in each compound include an alkyl group (preferably an alkyl group having 1 to 20 carbon atoms, e.g. methyl, ethyl, isopropyl, t-butyl, pentyl, heptyl, 1-ethylpentyl, benzyl, 2-ethoxyethyl, and 1-carboxymethyl), an alkenyl group (preferably an alkenyl group having 2 to 20 carbon atoms, e.g. vinyl, allyl and oleyl), an alkynyl group (preferably an alkynyl group having 2 to 20 carbon atoms, e.g. ethynyl, butadiynyl, and phenylethynyl), a cycloalkyl group (preferably a cycloalkyl group having 3 to 20 carbon atoms, e.g. cyclopropyl, cyclopentyl, cyclohexyl, and 4-methylcyclohexyl), an aryl group (preferably an aryl group having 6 to 26 carbon atoms, e.g. phenyl, 1-naphthyl, 4-methoxyphenyl, 2-chlorophenyl, and 3-methylphenyl), a heterocyclic group (preferably a heterocyclic group having 2 to 20 carbon atoms, more preferably a 5- or 6-membered heterocyclic group having at least one oxygen atom, sulfur atom or nitrogen atom, e.g. 2-pyridyl, 4-pyridyl, 2-imidazolyl, 2-benzimidazolyl, 2-thiazolyl, and 2-oxazolyl), an alkoxy group (preferably an alkoxy group having 1 to 20 carbon atoms, e.g. methoxy, ethoxy, isopropyloxy, and benzyloxy), an aryloxy group (preferably an aryloxy group having 6 to 26 carbon atoms, e.g. phenoxy, 1-naphthyloxy, 3-methylphenoxy, and 4-methoxyphenoxy), an alkoxycarbonyl group (preferably an alkoxycarbonyl group having 2 to 20 carbon atoms, e.g. ethoxycarbonyl and 2-ethylhexyloxycarbonyl), an amino group (preferably an amino group, an alkylamino group and an arylamino group each having 0 to 20 carbon atoms, e.g. amino, N,N-dimethylamino, N,N-diethylamino, N-ethylamino, and anilino), a sulfamoyl group (preferably a sulfonamide group having 0 to 20 carbon atoms, e.g. N,N-dimethylsulfamoyl, and N-phenylsulfamoyl), an acyl group (preferably an acyl group having 1 to 20 carbon atoms, e.g. acetyl, propionyl, butyryl, and benzoyl), an acyloxy group (preferably an acyloxy group having 1 to 20 carbon atoms, e.g. acetyloxy and benzoyloxy), a carbamoyl group (preferably a carbamoyl group having 1 to 20 carbon atoms, e.g. N,N-dimethylcarbamoyl, and N-phenylcarbamoyl), an acylamino group (preferably an acylamino group having 1 to 20 carbon atoms, e.g. acetylamino and benzoylamino), a sulfonamide group (preferably a sulfamoyl group having 0 to 20 carbon atoms, e.g. methane sulfonamide, benzene sulfonamide, N-methyl methane sulfonamide, and N-ethyl benzene sulfonamide), an alkylthio group (preferably an alkylthio group having 1 to 20 carbon atoms, e.g. methylthio, ethylthio, isopropylthio, and benzylthio), an arylthio group (preferably an arylthio group having 6 to 26 carbon atoms, e.g. phenylthio, 1-naphthylthio, 3-methylphenylthio, and 4-methoxyphenylthio), an alkyl- or aryl-sulfonyl group (preferably an alkyl- or aryl-sulfonyl group having 1 to 20 carbon atoms, e.g. methylsulfonyl, ethylsulfonyl, and benzene sulfonyl), a hydroxyl group, a cyano group, and a halogen atom (e.g. a fluorine atom, a chlorine atom, a bromine atom, and an iodine atom). Among these, an alkyl group, an alkenyl group, an aryl group, a heterocyclic group, an alkoxy group, an aryloxy group, an alkoxycarbonyl group, an amino group, an acylamino group, a hydroxyl group and a halogen atom are more preferable; and an alkyl group, an alkenyl group, a heterocyclic group, an alkoxy group, an alkoxycarbonyl group, an amino group, an acylamino group and a hydroxyl group are particularly preferable.

Moreover, each group exemplified as the substituent T may be further substituted with the above-described substituent T.

When a compound, a substituent or the like contains an alkyl group, an alkenyl group or the like, these groups may be linear or branched, and may be substituted or unsubstituted. Furthermore, when the compound, substituent or the like contains an aryl group, a heterocyclic group or the like, they may be monocyclic or fused-cyclic, and may be substituted or unsubstituted.

It is noted that in the present specification, the representation of the compound or the complex is used in the sense that not only the compound or complex itself, but also its salt and its ion are incorporated therein. For example, when the expression "contain a transition metal metallocene" is mentioned, such expression means that the transition metal metallocene may exist in a liquid electrolyte in the form of a metallocenium ion and its salt. Further, it is used in the sense that the compound includes a derivative thereof which is modified in a predetermined part in the range of achieving a desired effect. Further, in the present specification, a substituent or a linking group that is not specified by substitution or non-substitution means that the substituent may have an optional substituent. This is applied to the compound that is not specified by substitution or non-substitution. Preferable examples of the substituent include the substituent T described below.

(Organic Solvent)

The organic solvent to be used in the present invention is preferably a non-protonic organic solvent. Of these, a non-protonic organic solvent having 2 to 10 carbon atoms is preferable. The organic solvent is preferably a compound having an ether group, a carbonyl group, an ester group or a carbonate group. These compounds may have a substituent, and preferred examples thereof include those exemplified as the substituent T described above.

Examples the organic solvent include ethylene carbonate, propylene carbonate, butylene carbonate, dimethyl carbonate, diethyl carbonate, ethyl methyl carbonate, methyl propyl carbonate, γ-butyrolactone, γ-valerolactone, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, methyl acetate, ethyl acetate, methyl propionate, ethyl propionate, methyl butyrate, methyl isobutyrate, methyl trimethylacetate, ethyl trimethylacetate, acetonitrile, glutaronitrile, adiponitrile, methoxyacetonitrile, 3-methoxypropionitrile, N,N-dimethylformamide, N-methylpyrrolidinone, N-methyl oxazolidinone, N,N'-dimethylimidazolidinone, nitromethane, nitroethane, sulfolane, trimethyl phosphate, dimethyl sulfoxide, or dimethyl sulfoxide phosphate. These may be used alone or in combination of two or more. Of these, at least one selected from the group consisting of ethylene carbonate, propylene carbonate, dimethyl carbonate, diethyl carbonate and ethyl methyl carbonate is preferred. In particular, a combination of a high-viscosity (high-dielectric constant) solvent (for example, having a relative permittivity £ of 30 or more) such as ethylene carbonate or propylene carbonate with a low-viscosity solvent (for example, having a viscosity of up to 1 m·Pas) such as dimethyl carbonate, ethyl methyl carbonate or diethyl carbonate is more preferred because the dissociation ability and the ionic mobility of the electrolytic salt are improved.

However, the organic solvents used in the present invention is not limited to the above-described examples.

(Functional Additive)

A variety of functional additives is preferably contained in the liquid electrolyte of the present invention. Examples of the functions which are exerted by these additives include enhancement of flame retardance, improvement in cycling characteristics, and upgrade of capacitance characteristics. Examples of the functional additives which are preferably used for the liquid electrolyte of the present invention are shown below.

<Aromatic Compound (A)>

An aromatic compound includes a biphenyl compound and an alkyl-substituted benzene compound. The biphenyl compound has a partial structure in which two benzene rings bind to each other through a single bond. The benzene ring may have a substituent. Preferred examples of the substituent include an alkyl group having 1 to 4 carbon atoms (e.g. methyl, ethyl, propyl, and t-butyl), and an aryl group having 6 to 10 carbon atoms (e.g. phenyl and naphthyl).

The biphenyl compound specifically includes biphenyl, o-terphenyl, m-terphenyl, p-terphenyl, 4-methyl biphenyl, 4-ethyl biphenyl, and 4-tert-butyl biphenyl.

The alkyl-substituted benzene compound is preferably a benzene compound substituted with an alkyl group having 1 to 10 carbon atoms, and specifically includes cyclohexyl benzene, t-amyl benzene, and t-butyl benzene.

<Halogen-Containing Compound (B)>

As for the halogen atom which a halogen-containing compound has, a fluorine atom, a chlorine atom, or a bromine atom is preferable and a fluorine atom is more preferable. The number of the halogen atom is preferably from 1 to 6, and more preferably from 1 to 3. As for the halogen-containing compound, a carbonate compound substituted with a fluorine atom, a polyether compound having a fluorine atom, and a fluorine-substituted aromatic compound are preferable.

The halogen-containing compound is preferably a halogen-substituted carbonate compound, which may be either chain-like or ring-like. However, from the viewpoint of ion conductivity, a ring carbonate compound which has high coordinating property with an electrolyte salt (for example, lithium ion) is preferable and a 5-membered ring cyclic compound is preferable in particular.

Specific examples of preferable halogen-substituted carbonate compounds are shown below. Among these, compounds of Bex1 to Bex4 are preferable, and Bex1 is preferable in particular.

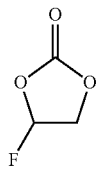
Bex1

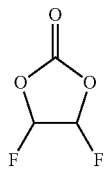
Bex2

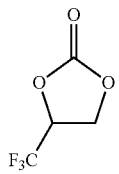
Bex3

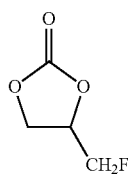
Bex4

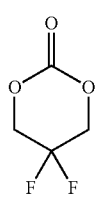
Bex5

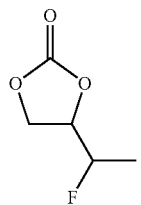
Bex6

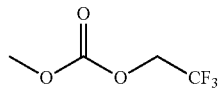
Bex7

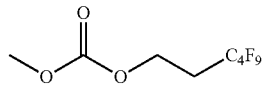
Bex8

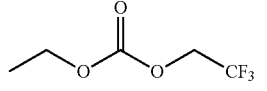
Bex9

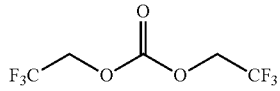
Bex10

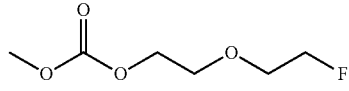
Bex11

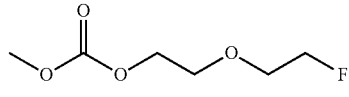
Bex12

<Polymerizable Compound (C)>

A polymerizable compound is preferably a compound having a carbon-carbon double bond, and more preferably a carbonate compound having a double bond, such as vinylene carbonate and vinylethylene carbonate, a compound having a group selected from an acrylate group, a methacrylate group, a cyanoacrylate group, and a αCF3 acrylate group, and a compound having a styryl group. A carbonate compound having a double bond or a compound having two or more polymerizable groups in the molecule thereof is more preferable.

<Phosphorus-Containing Compound (D)>

The phosphorus-containing compound is preferably a phosphoric acid ester compound and a phosphazene compound. Preferable examples of the phosphoric acid ester compound include trimethyl phosphate, triethyl phosphate, triphenyl phosphate, and tribenzyl phosphate. As for the phosphorus-containing compound, a compound represented by the following formula (D2) or (D3) is also preferable.

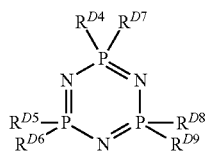
(D2)

-continued (D3)

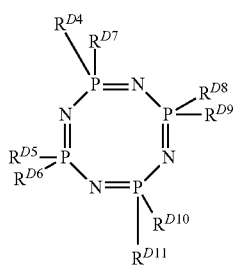

In formulas (D2) and (D3), $R^{D4}$ to $R^{D11}$ each represent a monovalent substituent. As the monovalent substituent, an alkyl group, an aryl group, an alkoxy group, an aryloxy group, an amino group, and a halogen atom, such as a fluorine atom, a chlorine atom, and a bromine atom, are preferable. At least one of the substituents represented by $R^{D4}$ to $R^{D11}$ is preferably a fluorine atom, and substituents which are composed of an alkoxy group, an amino group and a fluorine atom are more preferable.

<Sulfur-Containing Compound (E)>

A sulfur-containing compound is preferably a compound having a —$SO_2$—, —$SO_3$—, or —OS(=O)O— bond, and a cyclic sulfur-containing compound such as propane sultone, propene sultone, and ethylene sulfite, and sulfonic acid esters are preferable.

The sulfur-containing compound is preferably a compound represented by the following formula (E1) or formula (E2).

(E1)

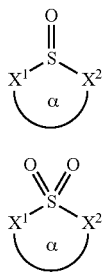

(E2)

In formulae, $X^1$ and $X^2$ each independently represent —O— or —C(Ra)(Rb)—. Herein, Ra and Rb each independently represent a hydrogen group or a substituent. As the substituent, an alkyl group having 1 to 8 carbon atoms, a fluorine atom and an aryl group having 6 to 12 carbon atoms are preferable. a represents a group of atoms for forming a 5- or 6-membered ring. The skeleton of a may contain a sulfur atom, an oxygen atom, and the like in addition to a carbon atom. a may be substituted; examples of a substituent include the above-mentioned substituent T, preferably an alkyl group, a fluorine atom, and an aryl group.

Eex1

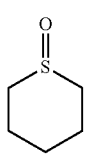

Eex2

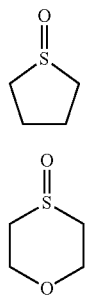

Eex3

Eex4

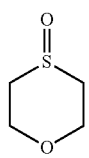

Eex5

Eex6

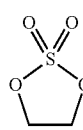

Eex7

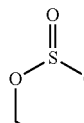

Eex8

Eex9

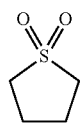

Eex10

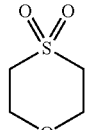

Eex11

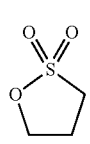

Eex12

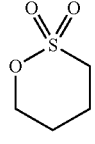

<Silicon-Containing Compound (F)>

A silicon-containing compound is preferably a compound represented by the following formula (F1) or (F2).

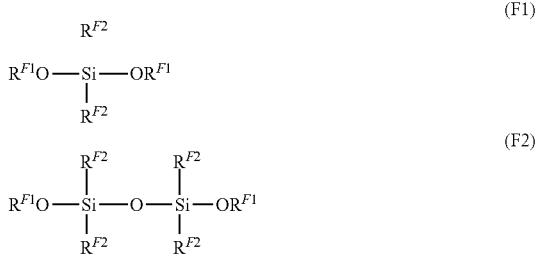

$R^{F1}$ represents an alkyl group, an alkenyl group, an acyl group, an acyloxy group, or an alkoxycarbonyl group.

$R^{F2}$ represents an alkyl group, an alkenyl group, an alkynyl group, or an alkoxy group.

Meanwhile, more than one $R^{F1}$ which exists in one formula may be different from one another, or the same and also more than one $R^{F2}$ which exists in the one formula may be different from one another, or the same.

<Nitrile Compound (G)>

A nitrile compound is preferably a compound represented by formula (G).

In formula (G), $R^{G1}$ to $R^{G3}$ each independently represent a hydrogen atom, an alkyl group, an alkoxycarbonyl group, an aryloxycarbonyl group, a cyano group, a carbamoyl group, a sulfonyl group, or a phosphonyl group. In each of the substituents, preferred ones can be referred to examples of the substituent T. Among them, a compound having a plurality of cyano groups in which any one or more of $R^{G1}$ to $R^{G3}$ is a cyano group is preferable.

ng represents an integer from 1 to 8.

Preferred specific examples of the compound represented by formula (G) include acetonitrile, propionitrile, isobutyronitrile, succinonitrile, malononitrile, glutaronitrile, adiponitrile, 2-methylglutaronitrile, hexanetricarbonitrile, and propanetetracarbonitrile; and particularly preferred examples include succinonitrile, malononitrile, glutaronitrile, adiponitrile, 2-methylglutaronitrile, hexanetricarbonitrile, and propanetetracarbonitrile. Preferred examples of these compounds include those having the following structures.

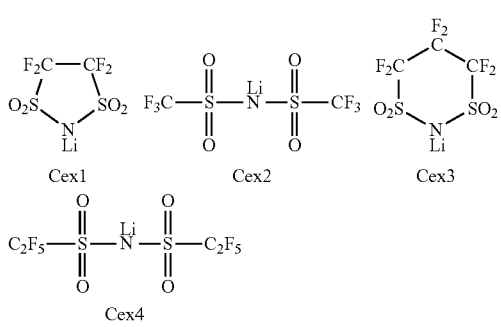

The liquid electrolyte of the present invention may contain at least one selected from the group consisting of a negative electrode film forming agent, a flame retardant and an overcharge preventing agent, as well as the compound (A) to (G) described above. The content ratio of these functional additives in the non-aqueous liquid electrolyte is not particularly limited but is each preferably 0.001% by mass to 10% by mass with respect to the whole non-aqueous liquid electrolyte. The addition of these compounds allows rupture and ignition of a battery to be restrained during disorder due to overcharge, and allows capacity maintenance characteristics and cycling characteristics to be improved after preservation at high temperature.

(Electrolyte)

Electrolyte that can be used in the liquid electrolyte of the present invention includes a metal or a salt thereof and a metal ion belonging to Group I or Group II of the Periodic Table or a salt thereof are preferable. The electrolyte is suitably selected depending on the purpose of a liquid electrolyte. For example, lithium salts, potassium salts, sodium salts, calcium salts, and magnesium salts can be mentioned. In a case where the liquid electrolyte is used in a secondary battery or the like, from the viewpoint of the output power of the secondary battery, a lithium salt is preferred. In a case of using the liquid electrolyte of the present invention as the electrolyte of a non-aqueous liquid electrolyte for lithium secondary batteries, a lithium salt may be selected as the salt of the metal ion. The lithium salt is not particularly limited as long as it is a lithium salt that is usually used in the electrolyte of a non-aqueous liquid electrolyte for lithium secondary batteries, but for example, the salts described below are preferred.

(L-1) Inorganic lithium salt: inorganic fluoride salt such as $LiPF_6$, $LiBF_4$, $LiAsF_6$, $LiSbF_6$; perhalogenic acid salts such as $LiClO_4$, $LiBRO_4$, $LiIO_4$; and inorganic chloride salt such as $LiAlCl_4$, and the like.

(L-2) Organic lithium salt containing fluorine: perfluoroalkanesulfonic acid salt such as $LiCF_3SO_3$; perfluoroalkanesulfonylimide salts such as $LiN(CF_3SO_2)_2$, $LiN(CF_3CF_2SO_2)_2$, $LiN(FSO_2)_2$, and $LiN(CF_3SO_2)(C_4F_9SO_2)$; perfluoroalkanesulfonylmethide salts such as $LiC(CF_3SO_2)_3$; fluoroalkyl fluorophosphoric acid salts such as $Li[PF_5(CF_2CF_2CF_3)]$, $Li[PF_4(CF_2CF_2CF_3)_2]$, $Li[PF_3(CF_2CF_2CF_3)_3]$, $Li[PF_5(CF_2CF_2CF_2CF_3)]$, $Li[PF_4(CF_2CF_2CF_2CF_3)_2]$, and $Li[PF_3(CF_2CF_2CF_2CF_3)_3]$, and the like.

(L-3) Oxalatoborate salts: lithium bis(oxalate)borate, lithium difluoro(oxalate)borate, and the like.

Among these, $LiPF_6$, $LiBF_4$, $LiAsF_6$, $LiSbF_6$, $LiClO_4$, $Li(Rf^1SO_3)$, $LiN(Rf^1SO_2)_2$, $LiN(FSO_2)_2$, and $LiN(Rf^1SO_2)(Rf^2SO_2)_2$ are preferred; and lithium imide salts such as $LiPF_6$, $LiBF_4$, $LiN(Rf^1SO_2)_2$, $LiN(FSO_2)_2$ and $LiN(Rf^1SO_2)(Rf^2SO_2)_2$ are more preferred. Herein, $Rf^1$ and $Rf^2$ each represent a perfluoroalkyl group.

Meanwhile, as for the lithium salt that is used in the liquid electrolyte, one kind may be used alone, or any two or more kinds may be used in combination.

The ion of metal belonging to Group I or Group II of the Periodic Table or the salt thereof in the liquid electrolyte is added to the liquid electrolyte in such an amount that the electrolyte is contained at a preferred salt concentration to be mentioned in the method for preparing the liquid electrolyte below. The salt concentration is selected according to the intended purpose of the liquid electrolyte, but the content is usually from 10 mass % to 50 mass %, and more preferably from 15 mass % to 30 mass %, relative to the total mass of the liquid electrolyte. When evaluated as the ionic concentration, the salt concentration need only be calculated in terms of the salt with a favorably applied metal.

[Method of Preparing Liquid Electrolyte and the Like]

The non-aqueous liquid electrolyte for a secondary battery of the present invention is prepared by a usual method in such a manner that the above-mentioned each component is dissolved in the non-aqueous liquid electrolyte solvent including an example using a lithium salt as a salt of metal ion.

The term "non-aqueous" as used in the present invention means that water is substantially not contained, and a small amount of water may be contained as long as the effects of the present invention are not impaired. In consideration of obtaining good properties, water is preferably contained in an amount of up to 200 ppm (mass standard) and more preferably up to 100 ppm. Although the lower limit is not particularly restricted, it is practical for the water content to be 10 ppm or more in consideration of inevitable incorporation. Although the viscosity of the liquid electrolyte of the present invention is not particularly limited, the viscosity at 25° C. is preferably 10 to 0.1 mPa·s, more preferably 5 to 0.5 mPa·s.

(Kit)

The liquid electrolyte of the present invention may be formed from a kit composed of plural liquids, powders or the like. For example, the liquid electrolyte may be in a form that a first agent (first liquid) is composed of an electrolyte and an organic solvent, a second agent (second liquid) is composed of the particular organometallic compound and an organic solvent, and the two liquids are mixed to prepare a liquid before use. At this time, in the kit of the present invention, the other additives and the like are contained in the first agent, the second agent and/or another agent (third agent). This fact allows an interaction between the above-mentioned polymerizable monomer and the above-mentioned polymerization initiator to be effectively obtained. The contents of the various components described above are preferably such that the contents are within the ranges described above after the components are mixed.

[Secondary Battery]

In the present invention, a non-aqueous secondary battery preferably contains the above-mentioned non-aqueous liquid electrolyte. A preferable embodiment is described while referring to FIG. 1 schematically illustrating a mechanism of a lithium ion secondary battery. Herein, the scope of the present invention is not limited by FIG. 1 and the description thereof.

The lithium ion secondary battery 10 of the present embodiment includes the above-described non-aqueous liquid electrolyte 5 for a secondary battery of the present invention, a positive electrode C (current collector for positive electrode 1, positive electrode active material layer 2) capable of insertion and release of lithium ions, and a negative electrode A (current collector for negative electrode 3, negative electrode active material layer 4) capable of insertion and discharge, or dissolution and precipitation, of lithium ions. In addition to these essential members, the lithium secondary battery may also be constructed to include a separator 9 that is disposed between the positive electrode and the negative electrode, current collector terminals (not shown), and an external case (not shown), in consideration of the purpose of using the battery, the form of the electric potential, and the like. According to the necessity, a protective element may also be mounted in at least any one side of the interior of the battery and the exterior of the battery. By employing such a structure, transfer of lithium ions a and b occurs in the liquid electrolyte 5, and charging α and discharging β can be carried out. Thus, operation and accumulation can be carried out by means of an operating means 6 through a circuit wiring 7.

(Battery Shape)

There are no particular limitations on the battery shape that is applied to the lithium secondary battery of the present embodiment, and examples of the shape include a bottomed cylindrical shape, a bottomed rectangular shape, a thin flat shape, a sheet shape, and a paper shape. The lithium secondary battery of the present embodiment may have any of these shapes. Furthermore, an atypical shape such as a horseshoe shape or a comb shape, which is designed in consideration of the form of the system or device into which the lithium secondary battery is incorporated, may also be used. Among them, from the viewpoint of efficiently releasing the heat inside of the battery to the outside thereof, a rectangular shape such as a bottomed rectangular shape or a thin flat shape, which has at least one relatively flat and large-sized surface, is preferred.

In a battery having the bottomed cylindrical shape, since the external surface area relative to the power generating element to be charged is small, it is preferable to design the battery such that the Joule heating that is generated due to the internal resistance at the time of charging or discharging is efficiently dissipated to the outside. Furthermore, it is preferable to design the lithium secondary battery such that the filling ratio of a substance having high heat conductibility is increased so as to decrease the temperature distribution inside the battery. The battery having the bottomed cylindrical shape will be described later together with FIG. 2.

(Battery-Constituting Members)

The lithium secondary battery of the present embodiment is constituted to include the liquid electrolyte 5, an electrode mixture of a positive electrode C and a negative electrode A, and basic member of the separator 9, based on Figure. These various members will be described below.

(Electrode Mixtures)

An electrode mixture is a sheet-like substance obtained by applying a dispersion of an active substance, an electroconductive agent, a binder, a filler and the like on a current collector (electrode substrate). For a lithium battery, a positive electrode mixture in which the active substance is a positive electrode active substance, and a negative electrode mixture in which the active substance is a negative electrode active substance are usually used. Next, each component in dispersions composing the electrode mixture (mixture, composition for electrode) is described.

Positive Electrode Active Substance

In the present invention, a transition metal oxide is used for a positive electrode active substance. As for this transition metal oxide, preferred is a material having a charging region in which the above-described organometallic compound can be oxidized, or a transition metal oxide material which allows insertion and release of an alkali metal ion. Specifically, a lithium-containing transition metal oxide having a lithium-insertion/release potential peak at 3.5 V or more to lithium is preferable. The insertion/release potential peak is more preferably 3.8 V or more, and most preferably 4.0 V or more. The insertion/release potential peak at this time can be identified by preparing a thin-film electrode of a positive electrode active substance in accordance with a Sol-Gel method or a sputtering method and then conducting an electrochemical measurement (cyclic voltammetry).

As a positive electrode active substance, a particulate positive electrode active substance may be used. Specifically, although as the positive electrode active substance, a transition metal oxide which is capable of reversible insertion and release of lithium ions can be used, it is preferable to use a lithium-containing transition metal oxide. Suitable examples of a lithium-containing transition metal oxide that is preferably used as a positive electrode active substance, include lithium-containing oxides containing one or more of Ti, V, Cr, Mn, Fe, Co, Ni, Cu, Mo, and W.

Furthermore, alkali metals other than lithium (elements of Group 1 (Ia) and Group 2 (IIa) of the Periodic Table), and/or Al, Ga, In, Ge, Sn, Pb, Sb, Bi, Si, P, B and the like may also be incorporated. The amount of incorporation is preferably from 0 mol % to 30 mol % relative to the amount of the transition metal.

Among the lithium-containing transition metal oxides that are preferably used as the positive electrode active substance, a substance synthesized by mixing a lithium compound and a transition metal compound (herein, the transition metal refers to at least one selected from Ti, V, Cr, Mn, Fe, Co, Ni, Mo, and W) such that the total molar ratio of lithium compound/transition metal compound is 0.3 to 2.2.

Furthermore, among the lithium compound/transition metal compound, materials containing $Li_gM3O_2$ (wherein M3 represents one or more elements selected from Co, Ni, Fe, and Mn; and g represents 0 to 1.2, preferably 0.02 to 1.2), or materials having a spinel structure represented by $Li_hM4_2O$ (wherein M4 represents Mn; and h represents 0 to 2, preferably 0.02 to 2) are particularly preferred. As M3 and M4 described above, Al, Ga, In, Ge, Sn, Pb, Sb, Bi, Si, P, B, or the like may also be incorporated in addition to the transition metal. The amount of incorporation is preferably from 0 to 30 mol % relative to the amount of the transition metal.

Among the materials containing $Li_gM3O_2$ and the materials having a spinel structure represented by $Li_hM4_2O$, $Li_gCoO_2$ (lithium cobalt oxide), $Li_gNiO_2$ (lithium nickel oxide), $Li_gMnO_2$ (lithium manganese oxide), $Li_gCo_jNi_{1-j}O_2$, $Li_hMn_2O_4$, $LiNi_jMn_{1-j}O_2$, $LiCo_jNi_hAl_{1-j-h}O_2$ (lithium nickel cobalt aluminate), $LiCo_jNi_hMn_{1-j-h}O_2$ (lithium nickel manganese cobalt oxide), $LiMn_hAl_{2-h}O_4$, $LiMn_hNi_{2-h}O_4$ (lithium manganese nickel oxide) (wherein in the respective formulas, g represents 0 to 2, preferably 0.02 to 1.2; j represents 0.1 to 0.9; and h represents 0 to 2, preferably 0.02 to 2) are particularly preferred; and $Li_gCoO_2$, $LiMn_2O_4$, $LiNi_{0.85}Co_{0.01}Al_{0.05}O_2$, and $LiNi_{0.33}Co_{0.33}Mn_{0.33}O_2$ are most preferred. From the viewpoints of high capacity and high power output, among those described above, an electrode containing Ni is more preferred. Herein, the g value and the h value are values prior to the initiation of charging and discharging, and are values that increase or decrease as charging or discharging occurs. Specific examples thereof include $LiCoO_2$, $LiNi_{0.5}Mn_{0.5}O_2$, $LiNi_{0.85}Co_{0.01}Al_{0.05}O_2$, $LiNi_{0.33}Co_{0.33}Mn_{0.33}O_2$, $LiMn_{1.8}Al_{0.2}O_4$, and $LiMn_{1.5}Ni_{0.5}O_4$.

Preferred examples of the transition metal of the lithium-containing transition metal phosphate compound include V, Ti, Cr, Mn, Fe, Co, Ni, and Cu, and specific examples of the compound include iron phosphates (lithium iron phosphates) such as $LiFePO_4$, $Li_3Fe_2(PO_4)_3$, and $LiFeP_2O_7$; cobalt phosphates such as $LiCoPO_4$; and compounds in which a portion of the transition metal atoms that constitute the main component of these lithium-transition metal phosphate compounds has been substituted by another metal such as Al, Ti, V, Cr, Mn, Fe, Co, Li, Ni, Cu, Zn, Mg, Ga, Zr, Nb, or Si.

Further, NCA (nickel cobalt aluminum) is preferable.

In the present invention, as for the positive electrode active substance, a material which is capable of maintaining an ordinary use at the positive electrode potential (Li/Li$^+$ standard) of 4.25 V or more is preferably used. Herein, the expression "capable of maintaining an ordinary use" means that even in case of charging at such voltage, an electrode material does not become unusable by deterioration of the positive electrode material. This potential is also called a usual usable potential. This potential is sometimes called simply a positive electrode potential. The above-described positive electrode potential (usual usable potential) is preferably 4.3 V or more. There is no particular upper limitation, but 5V or less is practical.

[Measuring Method of Electrode Potential (Li/Li$^+$ Standard)]

The positive electrode potential in case of charge is expressed by the following formula:

(Positive electrode potential)=(Negative electrode potential)+(Battery volt)

In case of using lithium titanate as a negative electrode, the negative electrode potential is fixed at 1.55 V. In case of using graphite as a negative electrode, the negative electrode potential is fixed at 0.1 V. At the time of charge, a battery volt is measured to calculate a positive electrode potential.

The positive electrode active substance which has the above-described particular charge range includes the following materials.

(i) $LiNi_xMn_yCo_zO_2$ ($x>0.2$, $y>0.2$, $z\geq0$, $x+y+z=1$)

Representative Examples $LiNi_{1/3}Mn_{1/3}Co_{1/3}O_2$ (also expressed as "$LiNi_{0.33}Mn_{0.33}Co_{0.33}O_2$")

$LiNi_{1/2}Mn_{1/2}O_2$ (also expressed as "$LiNi_{0.5}Mn_{0.5}O_2$")

(ii) $LiNi_xCo_yAl_zO_2$ ($x>0.7$, $y>0.1$, $0.1>z>0.05$, $x+y+z=1$)

Representative Examples $LiNi_{0.8}Co_{0.15}Al_{0.05}O_2$

As for the positive electrode active substance which has the above-described particular charge range, the following materials also can be used.

(a) $LiCoMnO_4$
(b) $Li_2FeMn_3O_8$
(c) $Li_2CuMn_3O_8$
(d) $Li_2CrMn_3O_8$
(e) $Li_2NiMn_3O_8$

The average particle size of the positive electrode active substance used in the non-aqueous electrolyte secondary battery of the present invention is not particularly limited, but the average particle size is preferably from 0.1 µm to 50 µm. The specific surface area is not particularly limited, but specific surface area as measured by the BET method is preferably from 0.01 m$^2$/g to 50 m$^2$/g. Furthermore, the pH of the supernatant obtainable when 5 g of the positive electrode active substance is dissolved in 100 mL of distilled water is preferably from 7 to 12.

In case where a conventionally used $TiS_2$ is used for the positive electrode active substance, this has a lower charge/discharge potential than a transition metal oxide positive electrode. As a result, the charge/discharge potential may not reach an electrode potential enough to oxidize the above-described particular organometallic compound. In this case, a positive electrode protective film cannot be efficiently formed and therefore this limits the efficacy of protecting a positive electrode by the present invention.

In order to adjust the positive electrode active substance to a predetermined particle size, a well-known pulverizer or classifier may be used. For example, a mortar, a ball mill, a vibrating ball mill, a vibrating mill, a satellite ball mill, a planetary ball mill, a swirling air flow jet mill, or a sieve is used. The positive electrode active substance obtained according to the calcination method may be used after washing the substance with water, an acidic aqueous solution, an alkaline aqueous solution, or an organic solvent.

The amount of the positive-electrode active material to be mixed in is not particularly limited. However, provided that the amount of solid content in the dispersion (mixture) forming the electrode mixture is 100% by mass, the amount of the positive-electrode active material is preferably 60% by mass to 98% by mass, and more preferably 70% by mass to 95% by mass.

Negative Electrode Active Substance

There are no particular limitations on the negative electrode active substance, as long as the negative electrode active substance is capable of reversible insertion and release of lithium ions, and examples thereof include carbonaceous materials, metal oxides such as tin oxide and silicon oxide, metal composite oxides, simple lithium substance or lithium alloys such as a lithium-aluminum alloy, and metals capable of forming an alloy with lithium, such as Sn and Si.

For these materials, one kind may be used alone, or two or more kinds may be used in any combination at any proportions. Among them, carbonaceous materials or lithium composite oxides are preferably used from the viewpoint of safety.

Furthermore, the metal composite oxides are not particularly limited as long as the materials are capable of adsorption and release of lithium, but it is preferable for the composite oxides to contain titanium and/or lithium as constituent components, from the viewpoint of high current density charging-discharging characteristics.

A carbonaceous material that is used as a negative electrode active substance is a material which is substantially composed of carbon. Examples thereof include petroleum pitch, natural graphite, artificial graphite such as vapor-grown graphite, and carbonaceous materials obtained by firing various synthetic resins such as PAN-based resins and furfuryl alcohol resins. Further, the examples include various carbon fibers such as PAN-based carbon fibers, cellulose-based carbon fibers, pitch-based carbon fibers, vapor-grown carbon fibers, dehydrated PVA-based carbon fibers, lignin carbon fibers, vitreous carbon fibers, and activated carbon fibers; mesophase microspheres, graphite whiskers, and tabular graphite.

These carbonaceous materials may be classified into hardly graphitized carbon materials and graphite-based carbon materials, according to the degree of graphitization. Also, it is preferable that the carbonaceous materials have the plane spacing, density, and size of crystallites described in JP-A-62-22066, JP-A-2-6856, and JP-A-3-45473. The carbonaceous materials are not necessarily single materials, and a mixture of natural graphite and an artificial graphite as described in JP-A-5-90844, a graphite having a coating layer as described in JP-A-6-4516, and the like can also be used.

In regard to the metal oxides and metal composite oxides that are negative electrode active substances used in the non-aqueous secondary battery, at least one of these may be included. The metal oxides and metal composite oxides are particularly preferably amorphous oxides, and furthermore, chalcogenides which are reaction products of metal elements and the elements of Group 16 of the Periodic Table are also preferably used. The term "amorphous" as used herein means that the substance has a broad scattering band having an apex at a 2θ value in the range of 20° to 40°, as measured by an X-ray diffraction method using CuKα radiation, and the substance may also have crystalline diffraction lines. The highest intensity obtainable among the crystalline diffraction lines exhibited at a 2θ value in the range of from 40° to 70° is preferably 100 times or less, and more preferably 5 times or less, than the diffraction line intensity of the apex of the broad scattering band exhibited at a 2θ value in the range of from 20° to 40°, and it is particularly preferable that the substance does not have any crystalline diffraction line.

Among the group of compounds composed of the amorphous oxides and chalcogenides, amorphous oxides and chalcogenides of semi-metallic elements are more preferred, and oxides and chalcogenides formed from one kind alone or combinations of two or more kinds of the elements of Group 13 (IIIB) to Group 15 (VB) of the Periodic Table, Al, Ga, Si, Sn, Ge, Pb, Sb and Bi are particularly preferred. Specific preferred examples of the amorphous oxides and chalcogenides include, for example, $Ga_2O_3$, $SiO$, $GeO$, $SnO$, $SnO_2$, $PbO$, $PbO_2$, $Pb_2O_3$, $Pb_2O_4$, $Pb_3O_4$, $Sb_2O_3$, $Sb_2O_4$, $Sb_2O_5$, $Bi_2O_3$, $Bi_2O_4$, $SnSiO_3$, $GeS$, $SnS$, $SnS_2$, $PbS$, $PbS_2$, $Sb_2S_3$, $Sb_2S_5$, and $SnSiS_3$ as for metal compounds. Furthermore, these may also be composite oxides with lithium oxide, for example, $Li_2SnO_2$.

The average particle size of the negative electrode active substance used in the non-aqueous secondary battery is preferably from 0.1 μm to 60 μm. In order to adjust the negative electrode active substance to a predetermined particle size, a well-known pulverizer or classifier may be used. For example, a mortar, a ball mill, a sand mill, a vibrating ball mill, a satellite ball mill, a planetary ball mill, a swirling air flow jet mill, and a sieve are favorably used. At the time of pulverization, wet pulverization of using water or an organic solvent such as methanol to co-exist with the negative electrode active substance can also be carried out as necessary. In order to obtain a desired particle size, it is preferable to perform classification. There are no particular limitations on the classification method, and a sieve, an air classifier or the like can be used as necessary. Classification may be carried out by using a dry method as well as a wet method.

The chemical formula of the compound obtained by the calcination method can be obtained by using an inductively coupled plasma (ICP) emission spectroscopic method as a measurement method, and computed from the mass difference of the powder measured before and after calcination, as a convenient method.

Suitable examples of the negative electrode active substance that can be used together with the amorphous oxide negative electrode active substances represented by Sn, Si and Ge, include carbon materials that are capable of adsorption and release of lithium ions or lithium metal, as well as lithium, lithium alloys, and metal capable of alloying with lithium.

In the present invention, it is preferable to use lithium titanate, more specifically lithium titanium oxide ($Li[Li_{1/3}Ti_{5/3}]O_4$), as an active material of the negative electrode.

The amount of the negative-electrode active material mixed in the dispersion (mixture) forming the electrode mixture is not particularly limited. However, the amount is preferably 60% by mass to 98% by mass and more preferably 70% by mass to 95% by mass, based on 100% by mass of the solid content.

Electroconductive Material

As for the electroconductive material, any material may be used as long as it is an electron conductive material which does not cause a chemical change in a constructed secondary battery, and any known electroconductive material can be used. Usually, electroconductive materials such as natural graphite (scale-like graphite, flaky graphite, earthly graphite, and the like), artificial graphite, carbon black, acetylene black, Ketjen black, carbon fibers, metal powders (copper, nickel, aluminum, silver (described in JP-A-63-148, 554), and the like), metal fibers, and polyphenylene derivatives (described in JP-A-59-20,971) can be incorporated alone or as mixtures thereof. Among them, a combination of graphite and acetylene black is particularly preferred. The amount of the conductive material added in the dispersion (mixture) forming the electrode mixture is preferably 0.1% by mass to 50% by mass, and more preferably 0.5% by mass to 30% by mass, based on 100% by mass of the solid content. In the case of carbon or graphite, the amount of addition in the dispersion is particularly preferably from 0.5 mass % to 15 mass %.

Binder

Preferred examples of the binder include polysaccharides, thermoplastic resins, and polymers having rubber elasticity, and among them, preferred examples include emulsions (latexes) or suspensions of starch, carboxymethyl cellulose, cellulose, diacetyl cellulose, methyl cellulose, hydroxyethyl cellulose, hydroxypropyl cellulose, sodium alginate; water-soluble polymers such as poly(acrylic acid), poly(sodium acrylate), polyvinylphenol, poly(vinyl methyl ether), poly(vinyl alcohol), polyvinylpyrrolidone, polyacrylonitrile, polyacrylamide, poly(hydroxy(meth)acrylate), and a styrene-maleic acid copolymer; poly(vinyl chloride), polytetrafluoroethylene, poly(vinylidene fluoride), a tetrafluoroethylene-hexafluoropropylene copolymer, a vinylidene fluoride-tetrafluoroethylene-hexafluoropropylene copolymer, polyethylene, polypropylene, an ethylene-propylene-diene terpolymer (EPDM), a sulfonated EPDM, a poly(vinyl acetal) resin, (meth)acrylic acid ester copolymers containing (meth)acrylic acid esters such as methyl methacrylate and 2-ethylhexyl acrylate, a (meth)acrylic acid ester-acrylonitrile copolymer, a poly(vinyl ester) copolymer containing a vinyl ester such as vinyl acetate, a styrene-butadiene copolymer, an acrylonitrile-butadiene copolymer, polybutadiene, a neoprene rubber, a fluorine rubber, poly(ethylene oxide), a polyester polyurethane resin, a polyether polyurethane resin, a polycarbonate polyurethane resin, a polyester resin, a phenolic resin, and an epoxy resin. More preferred examples include a poly(acrylic acid ester)-based latex, carboxymethyl cellulose, polytetrafluoroethylene, and poly(vinylidene fluoride).

As for the binder, one kind may be used alone, or two or more kinds may be used as mixtures. If the amount of addition of the binder is small, the retention power and the aggregating power of the electrode mixture are weakened. If the amount of addition is too large, the electrode volume increases, and the capacity per unit volume or unit mass of the electrode is decreased. For such reasons, in the dispersion (mixture) forming the electrode mixture, the amount of addition of the binder is preferably from 1 mass % to 30 mass %, and more preferably from 2 mass % to 10 mass %, based on 100 mass % of the solid content.

Filler

The electrode mixture may contain a filler. Regarding the material that forms the filler, any fibrous material that does not cause a chemical change in the secondary battery of the present invention can be used. Usually, fibrous fillers formed from olefinic polymers such as polypropylene and polyethylene, and materials such as glass and carbon are used. The amount of addition of the filler is not particularly limited. However, in the dispersion (mixture) forming the electrode mixture, the amount of addition is preferably from 0 mass % to 30 mass %, based on 100 mass % of the solid content.

Current Collector

As the current collector for the positive and negative electrodes, an electron conductor that does not cause a chemical change in the non-aqueous secondary battery of the present invention is used. Preferred examples of the current collector for the positive electrode include aluminum, stainless steel, nickel, and titanium, as well as aluminum or stainless steel treated with carbon, nickel, titanium, or silver on the surface. Among them, aluminum and aluminum alloys are more preferred.

Preferred examples of the current collector for the negative electrode include aluminum, copper, stainless steel, nickel, and titanium, and more preferred examples include aluminum, copper and copper alloys.

Regarding the shape of the current collector, a film sheet-shaped current collector is usually used, but a net-shaped material, a film sheet formed by punching, a lath material, a porous material, a foam, a material obtained by molding a group of fibers, and the like can also be used. The thickness of the current collector is not particularly limited, but the thickness is preferably from 1 µm to 500 µm. Furthermore, it is also preferable to provide surface unevenness on the surface of the current collector through a surface treatment.

Electrode mixtures for lithium secondary batteries are formed by members appropriately selected from these materials.

(Separator)

The separator that can be used in the present invention is not particularly limited as long as the separator is formed of a material which electronically insulates the positive electrode and the negative electrode, and has mechanical strength, ion permeability, and oxidation-reduction resistance at the surfaces in contact with the positive electrode and the negative electrode. Examples of such a material that may be used include porous polymer materials or inorganic materials, organic-inorganic hybrid materials, and glass fibers. These separators preferably have a shutdown function for securing safety, that is, a function of increasing resistance by blocking the voids at 80° C. or more, and thereby cutting off the electric current, and the blocking temperature is preferably from 90° C. to 180° C.

The shape of the pores of the separator is usually circular or elliptical, and the size is from 0.05 µm to 30 µm, and preferably from 0.1 µm to 20 µm. Furthermore, as in the case of producing the material by an extension method or a phase separation method, a material having rod-shaped or irregularly shaped pores may also be used. The proportion occupied by these pores, that is, the pore ratio, is 20% to 90%, and preferably 35% to 80%.

Regarding the polymer materials described above, a single material such as cellulose nonwoven fabric, polyethylene, or polypropylene may be used, or a compositized material of two or more kinds may also be used. A laminate of two or more kinds of finely porous films that are different in the pore size, pore ratio, pore blocking temperature and the like, is preferred.

As the inorganic material, oxides such as alumina and silicon dioxide, nitrides such as aluminum nitride and silicon nitride, and sulfates such as barium sulfate and calcium sulfate are used, and a particle-shaped or fiber-shaped material is used. Regarding the form, a thin film-shaped material such as a nonwoven fabric, a woven fabric, or a finely porous film is used. In the case of a thin film-shaped material, a material having a pore size from 0.01 µm to 1 µm and a thickness from 5 μm to 50 μm is favorably used. In addition to the independent thin film-shaped materials described above, a separator obtained by forming a composite porous layer containing particles of the inorganic substance described above, as a surface layer of the positive electrode and/or the negative electrode by using a binder made of a resin, can be employed. For example, a separator in which alumina particles having a 90% particle size of less than 1 μm are formed on both surfaces of the positive electrode as porous layers by using a binder of a fluororesin, may be used.

(Preparation of Non-Aqueous Electrolyte Secondary Battery)

As the shape of the lithium secondary battery, any form such as a sheet form, a rectangular form, or a cylindrical form can be applied as described above. The (dispersion) mixture containing the positive electrode active substance or the negative electrode active substance is mainly used after being applied (coated) on a current collector, dried, and compressed.

Hereinafter, a bottomed cylindrical lithium secondary battery 100 will be taken as an example, and its configuration and a production method thereof will be described with reference to FIG. 2. In a battery having a bottomed cylindrical shape, since the external surface area relative to the power generating element to be charged is small, it is preferable to design the battery such that the Joule heating that is generated due to the internal resistance at the time of charging or discharging is efficiently dissipated to the outside. Furthermore, it is preferable to design the lithium secondary battery such that the filling ratio of a substance having high heat conductibility is increased so as to decrease the temperature distribution inside the battery. FIG. 2 is an example of a bottomed cylindrical lithium secondary battery 100. This cell is a bottomed cylindrical lithium secondary battery 100 in which a positive electrode sheet 14 and a negative electrode sheet 16 that are superimposed with a separator 12 interposed therebetween, are wound and accommodated in a packaging can 18. In addition, reference numeral 20 in the diagram represents an insulating plate, 22 represents an opening sealing plate, 24 represents a positive electrode current collector, 26 represents a gasket, 28 represents a pressure-sensitive valve body, and 30 represents a current blocking element. Meanwhile, the diagram inside the magnified circle is indicated with varying hatchings in consideration of visibility, but the various members are equivalent to the overall diagram by the reference numerals.

First, a negative electrode active substance is mixed with a solution prepared by dissolving a binder, a filler and the like that are used as desired in an organic solvent, and thus a negative electrode mixture is prepared in a slurry form or in a paste form. The negative electrode mixture thus obtained is uniformly applied over the entire surface of both sides of a metal core as a current collector, and then the organic solvent is removed to form a negative electrode active substance layer. Furthermore, the laminate (mixture) of the current collector and the negative electrode active substance layer is rolled by using a roll pressing machine or the like to produce a laminate having a predetermined thickness, and thereby, a negative electrode sheet (electrode sheet) is obtained. At this time, the application method for each agent, the drying of applied matter, and the formation method for positive and negative electrodes may conform to the usual method.

In the present embodiment, a cylindrical battery has been explained as an example, but the present invention is not limited to this. For example, positive and negative electrode sheets (mixture) produced by the methods described above are superimposed with a separator interposed therebetween, and then the assembly may be processed directly into a sheet-like battery. Alternatively, a rectangular-shaped battery may be formed by folding the assembly, inserting the assembly into a rectangular can, electrically connecting the can with the sheet, subsequently injecting an electrolyte, and sealing the opening by using an opening sealing plate.

In all of the embodiments, a safety valve can be used as an opening sealing plate for sealing the opening. Furthermore, an opening sealing member may be equipped with various safety elements that are conventionally known, in addition to the safety valve. For example, as overcurrent preventing elements, a fuse, a bimetal, a PTC element and the like are favorably used.

Furthermore, as a countermeasure for an increase in the internal pressure of the battery can, a method of inserting a slit in the battery can, a gasket cracking method, an opening sealing plate cracking method, or a method of disconnecting from a lead plate can be used in addition to the method of providing a safety valve. Furthermore, a protective circuit incorporated with an overcharge-coping member or an overdischarge-coping member may be provided to a charging machine, or the aforementioned protective circuit may be independently provided.

For the can or the lead plate, a metal or an alloy having electrical conductibility can be used. For example, metals such as iron, nickel, titanium, chromium, molybdenum, copper, and aluminum, or alloys thereof are favorably used.

For the welding method that may be used when a cap, a can, a sheet, and a lead plate are welded, any known methods (for example, an electric welding method using a direct current or an alternating current, a laser welding method, an ultrasonic welding method, and the like) can be used. As the sealing agent for sealing an opening, any conventionally known compounds such as asphalt, and mixtures can be used.

[Use of Non-Aqueous Secondary Battery]

Non-aqueous secondary batteries of the present invention are applied to various applications since the secondary batteries have satisfactory cycling characteristics.

There are no particular limitations on the application embodiment for the lithium secondary battery, but in the case of mounting the lithium secondary battery in electronic equipment, examples of the equipment include notebook computers, pen-input computers, mobile computers, electronic book players, mobile telephones, cordless phone handsets, pagers, handy terminals, portable facsimiles, portable copying machines, portable printers, headphone stereo sets, video movie cameras, liquid crystal television sets, handy cleaners, portable CDs, mini disc players, electric shavers, transceivers, electronic organizers, calculators, memory cards, portable tape recorders, radios, backup power supplies, and memory cards. Other additional applications for consumer use include automobiles, electromotive vehicles, motors, lighting devices, toys, game players, load conditioners, timepieces, strobes, cameras, and medical devices (pacemakers, hearing aids, shoulder massaging machines, and the like). Furthermore, the lithium secondary battery can be used as various batteries for munition and space batteries. Also, the lithium secondary battery can be combined with a solar cell.

Although the metal ion that may be used for charge transport in the secondary battery is not particularly limited, it is preferable to use the ion of the metals belonging to Group 1 or 2 of the Periodic Table. Among them, ions such as lithium ion, sodium ion, magnesium ion, calcium ion and aluminum ion are preferably used. As for the general technical matters of secondary batteries using lithium ions, a lot of literatures and books including the references mentioned at the beginning of the specification are published and referenced therefor. In addition, Journal of Electrochemical Society; Electrochemical Science and Technology (US, 1980, Vol. 127, pp. 2097-2099) and the like can be referenced for the secondary battery using sodium ions. Nature 407, pp. 724-727 (2000) and the like can be referenced for magnesium ion. J. Electrochem. Soc., Vol. 138, 3536 (1991) and the like can be referenced for calcium ion. The present invention is preferably applied to lithium ion secondary batteries because they are widely spread but the present invention also has a desired effect on other articles than the lithium ion secondary batteries and should not be construed as being limited thereto.

EXAMPLES

Hereinafter, the present invention will be described in more detail with reference to examples, but the present invention is not limited to these examples.

Example 1/Comparative Example 1

Preparation of Liquid Electrolyte

The organometallic compounds shown in Table 1 were added to a liquid electrolyte of 1M $LiPF_6$ ethylene carbonate/diethyl carbonate at a volume ratio of 1:1 by the amount described in Table 1 to prepare a test liquid electrolyte.

Preparation of 2032-Type Coin Battery

A positive electrode was produced by using an active material: lithium nickel manganese cobalt oxide ($LiNi_{1/3}Mn_{1/3}Co_{1/3}O_2$) 85% by mass, a conductive assistant: carbon black 7% by mass and a binder: PVDF (poly(vinylidene difluoride)) 8% by mass, and a negative electrode was produced by using an active material: LTO (lithium titanium oxide) 86% by mass, a conductive assistant: carbon black 6% by mass and a binder: PVDF 8% by mass. A separator was 25 μm thick made of polypropylene. A 2032-type coin battery was produced for each test liquid electrolyte by using the above-mentioned positive and negative electrodes and separator to evaluate the following items. The results are shown in Table 1.

<Capacity Maintaining Ratio—300th Cycle>

A 2032-type coin battery produced by the method described above was used, and in a thermostatic chamber at 60° C., the battery was subjected to constant current charging at 1 C until the battery voltage reached 4.4 V at 4.0 mA, subsequently to charging at a constant voltage of 4.4 V until the current value reached 0.12 mA provided that the upper limit of the charging time of period was set at 2 hours. The battery was then subjected to constant current discharging at 1 C until the battery voltage reached 2.75 V at 4.0 mA. The above operation was regarded as 1 cycle, and this cycle was repeated 300 times to measure the discharge capacity (mAh) of the 300th cycle.

Discharge capacity maintaining ratio (%)={(Discharge capacity on 300th cycle)/(Discharge capacity on 1st cycle)}×100

<High-Rate Discharge Characteristic—300th Cycle>

The battery subjected to the cycle test conducted by the above-described method was subjected to constant current charging at 1 C until the battery voltage reached 2.85 V at 4.0 mA, and then charged until the current value at the 2.85 V constant voltage reached 0.02 mA to form a full charge condition, and then a quantity of charged electricity was measured. Next, the battery was subjected to constant current discharging at 4 C until the battery voltage reached 1.2 V at 16.0 mA, and then a quantity of discharged electricity (mAh) at the time of high-rate discharge was measured.

High-rate discharge efficiency (%)=(Quantity of discharged electricity at 4 C)/(Quantity of charged electricity at full charge)×100

TABLE 1

| No. | Compound <1> | Addition amount (mol/L) | Compound <2> | Addition amount (mol/L) | Cycling characteristic/ 300th cycle | 4 C discharge efficiency/ 300th cycle |
|---|---|---|---|---|---|---|
| 101 | I-1 | 0.04 | | | 82 | 53.3 |
| 102 | I-2 | 0.02 | | | 83 | 51.5 |
| 103 | I-3 | 0.02 | | | 81 | 55.1 |
| 104 | I-6 | 0.002 | | | 85 | 55.3 |
| 105 | I-7 | 0.001 | | | 89 | 62.3 |
| 106 | 1-8 | 0.0005 | | | 88 | 61.6 |
| 107 | I-13 | 0.006 | | | 90 | 64.8 |
| 108 | I-15 | 0.002 | | | 92 | 59.8 |
| 109 | I-18 | 0.0005 | | | 95 | 65.6 |
| 110 | I-19 | 0.0004 | | | 96 | 68.2 |
| 111 | 1-20 | 0.004 | | | 88 | 54.6 |
| 112 | 1-21 | 0.005 | | | 85 | 55.3 |
| 113 | I-7 | 0.001 | I-21 | 0.002 | 92 | 62.6 |
| 114 | I-21 | 0.002 | I-23 | 0.002 | 93 | 64.2 |
| 115 | I-1 | 0.01 | | | 85 | 55.6 |
| 116 | 1-1 | 0.001 | | | 87 | 56.4 |
| 117 | I-19 | 0.001 | | | 92 | 64.3 |
| 118 | I-19 | 0.005 | | | 88 | 55.1 |
| C11 | None | | | | 72 | 37.4 |
| C12 | H-1 | 0.2 | | | 71 | 35.6 |
| C13 | H-1 | 0.01 | | | 76 | 42.3 |
| C14 | H-2 | 0.2 | | | 76 | 29.6 |
| C15 | H-2 | 0.015 | | | 78 | 45.6 |
| C16 | I-1 | 0.1 | | | Charge failure | Charge failure |
| C17 | I-1 | 1 | | | Charge failure | Charge failure |
| C18 | I-1 | 5 | | | Charge failure | Charge failure |

The term "charge failure" described herein indicates that a first charging time took 4 or more times with respect to a charging amount in Comparative Example C11 containing none of additives. It is thought that this problem comes as a result that the compound I-1 has a function as a redox shuttle agent and therefore in case of adding it in a large quantity, this makes it difficult for the compound I-1 to be consumed by oxidation. The same goes for the following Examples.

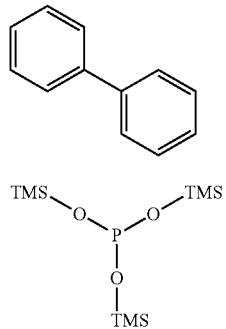

The particular organometallic compound used in the present invention allows effective improvement in cycling characteristics by an extremely small addition amount thereof. In contrast, the effect cannot be achieved by the compounds (H-1, H-2) in Comparative Examples within the same range of addition amount. Superiority of the positive electrode-protective film (SEI) derived from the particular organometallic compound is apparent from these comparisons.

Further, it is understood that a high-performance SEI can be obtained by mixing the particular organometallic compounds (No. 113) to accelerate a film formation and to suppress kinetically a film formation derived from solvent/electrolyte oxidation (see the following scheme), or a higher performance SEI can be obtained by making a plurality of elements exist together to change characteristics of the oxidized film to be formed (zirconium+yttrium) and thereby to enhance ion conductivity and stability (No. 114).

Further, the metallocene such as ferrocene and the like has been known as an overcharge-preventing agent. However, this case presupposes to use an addition amount thereof to a larger degree as compared to the present invention (No. C16). In this case, a redox shuttle function is so strong that charge is impossible as a matter of practice. Meanwhile, a blend amount of the metallocene in Example of the above-described Patent Literature 5 is estimated to be 0.2 mol/L or more. That is to say, it is understood that the minor addition is no longer just a small addition amount, but has a characteristic technical significance to achieve the function effect of the present invention.

Example 2/Comparative Example 2

A 2032-type coin battery was produced in the same manner as in Example 1, except that the active materials of the positive electrode and the negative electrode were changed.
Positive electrode active material: Lithium cobalt oxide ($LiCoO_2$)
Negative electrode active material: Graphite
Regarding the evaluation test, the charging voltage was changed from 4.4 V to 4.2 V in both the cycling characteristic test and the rate characteristic test, but otherwise the same test conditions as in Example 1 were used.

The results are shown below.

TABLE 2

| No. | Compound <1> | Addition amount (mol/L) | Cycling characteristic/ 300th cycle | 4 C discharge efficiency/ 300th cycle |
|---|---|---|---|---|
| 201 | I-1 | 0.03 | 75 | 45.8 |
| 202 | I-2 | 0.01 | 76 | 44.3 |
| 203 | I-4 | 0.015 | 75 | 47.4 |
| 204 | I-5 | 0.001 | 78 | 47.5 |
| 205 | I-7 | 0.001 | 82 | 53.6 |
| 206 | I-9 | 0.001 | 83 | 52.1 |
| 207 | I-10 | 0.0008 | 81 | 53.0 |
| 208 | I-11 | 0.004 | 83 | 55.7 |
| 209 | I-16 | 0.001 | 85 | 51.4 |
| 210 | I-18 | 0.0007 | 87 | 56.4 |
| 211 | I-19 | 0.0008 | 88 | 58.6 |
| 212 | I-22 | 0.002 | 81 | 46.9 |
| 213 | I-23 | 0.003 | 78 | 47.5 |
| 214 | I-1 | 0.001 | 78 | 46.3 |
| 215 | I-1 | 0.0001 | 80 | 47.3 |
| 216 | I-18 | 0.01 | 85 | 46.3 |
| C21 | None | | 52 | 30.0 |
| C22 | H-1 | 0.21 | 51 | 28.5 |
| C23 | H-1 | 0.015 | 55 | 33.8 |
| C24 | H-2 | 0.25 | 55 | 23.7 |
| C25 | H-2 | 0.025 | 56 | 36.5 |
| C26 | I-1 | 0.1 | Charge failure | Charge failure |
| C27 | I-1 | 1 | Charge failure | Charge failure |
| C28 | I-1 | 5 | Charge failure | Charge failure |

Example 3/Comparative Example 3

A 2032-type coin battery was produced in the same manner as in Example 1, except that the liquid electrolyte and the separator were changed.
Liquid Electrolyte
The organometallic compounds shown in Table 3 were added to a liquid electrolyte of 1M $LiPF_6$ ethylene carbonate/γ-butyrolactone at a volume ratio of 3:7 by the amount described in Table 3 to prepare a test liquid electrolyte.
Separator
Cellulose nonwoven fabric, 40 to 50 μm thickness
Regarding the evaluation test, the charging voltage was changed from 4.4 V to 2.85 V in both the cycling characteristic test and the rate characteristic test, but otherwise the same test conditions as in Example 1 were used.
The results are shown below.

TABLE 3

| No. | Compound <1> | Addition amount (mol/L) | Cycling characteristics/ 300th cycle | 4 C discharge efficiency/ 300th cycle |
|---|---|---|---|---|
| 301 | I-1 | 0.0005 | 80 | 52.0 |
| 302 | I-2 | 0.001 | 81 | 50.2 |
| 303 | I-7 | 0.001 | 82 | 55.8 |
| 304 | I-8 | 0.0005 | 84 | 54.6 |
| 305 | I-11 | 0.001 | 91 | 63.7 |
| 306 | I-15 | 0.0004 | 89 | 62.3 |
| 307 | I-18 | 0.0005 | 92 | 66.2 |
| 308 | I-19 | 0.00025 | 94 | 61.1 |
| 309 | I-24 | 0.0003 | 96 | 66.2 |
| 310 | I-25 | 0.00025 | 98 | 69.6 |
| 311 | 1-20 | 0.004 | 89 | 55.2 |
| 312 | I-21 | 0.005 | 84 | 54.6 |
| 313 | I-1 | 0.001 | 77 | 48.3 |
| 314 | I-1 | 0.05 | 74 | 38.3 |
| 315 | I-19 | 0.005 | 90 | 54.9 |
| C31 | None | — | 71 | 36.9 |
| C32 | H-1 | 0.2 | 68 | 35.6 |
| C33 | H-1 | 0.01 | 69 | 42.3 |

TABLE 3-continued

| No. | Compound <1> | Addition amount (mol/L) | Cycling characteristics/ 300th cycle | 4 C discharge efficiency/ 300th cycle |
|---|---|---|---|---|
| C34 | H-2 | 0.2 | 84 | 32.8 |
| C35 | H-2 | 0.015 | 79 | 45.6 |
| C36 | I-1 | 0.1 | Charge failure | Charge failure |
| C37 | I-1 | 1 | Charge failure | Charge failure |
| C38 | I-1 | 5 | Charge failure | Charge failure |
| C39 | I-19 | 0.2 | Charge failure | Charge failure |

Example 4/Comparative Example 4

A 2032-type coin battery was produced in the same manner as in Example 1, except that the liquid electrolyte, and the active materials of the positive electrode and the negative electrode were changed.
Liquid Electrolyte
The organometallic compounds shown in Table 4 were added to a liquid electrolyte of 1M $LiPF_6$ ethylene carbonate/ethyl methyl carbonate at a volume ratio of 1:2 by the amount described in Table 4 to prepare a test liquid electrolyte.
Positive electrode active material: Lithium manganese oxide ($LiMn_2O_4$)
Negative electrode active material: Graphite
Regarding the evaluation test, the same test conditions as in Example 1 were used.
The results are shown below.

TABLE 4

| No. | Compound <1> | Addition amount (mol/L) | Cycling characteristics/ 300th cycle | 4 C discharge efficiency/ 300th cycle |
|---|---|---|---|---|
| 401 | I-1 | 0.001 | 75 | 44.7 |
| 402 | I-2 | 0.00015 | 78 | 43.2 |

TABLE 4-continued

| No. | Compound <1> | Addition amount (mol/L) | Cycling characteristics/ 300th cycle | 4 C discharge efficiency/ 300th cycle |
|---|---|---|---|---|
| 403 | I-7 | 0.0005 | 84 | 48.0 |
| 404 | I-8 | 0.0004 | 86 | 47.0 |
| 405 | I-11 | 0.005 | 88 | 54.8 |
| 406 | I-15 | 0.00025 | 88 | 52.1 |
| 407 | I-18 | 0.0001 | 86 | 53.6 |
| 408 | I-19 | 0.00019 | 92 | 57.0 |
| 409 | I-24 | 0.00027 | 94 | 52.5 |
| 410 | I-25 | 0.0003 | 92 | 57.0 |
| 411 | I-20 | 0.00025 | 92 | 59.8 |
| 412 | I-21 | 0.0002 | 91 | 47.5 |
| 413 | I-1 | 0.01 | 68 | 40.2 |
| 414 | I-1 | 0.00025 | 78 | 43.9 |
| 415 | I-19 | 0.005 | 89 | 54.0 |
| C41 | None | — | 53 | 29.5 |
| C42 | H-1 | 0.21 | 47 | 28.5 |
| C43 | H-1 | 0.015 | 51 | 33.8 |
| C44 | H-2 | 0.25 | 62 | 26.2 |
| C45 | H-2 | 0.025 | 54 | 36.5 |
| C46 | I-1 | 0.1 | Charge failure | Charge failure |
| C47 | I-1 | 1 | Charge failure | Charge failure |
| C48 | I-1 | 5 | Charge failure | Charge failure |

As shown by the results of the above-described Examples 2 to 4 and Comparative Examples 2 to 4, it is understood that the liquid electrolyte of the present invention also exerts good performances even in the systems in which the battery-constituting materials have been changed.

Example 5/Comparative Example 5

The cycling characteristic test was conducted in the same manner as in Example 1, except that the voltage to be applied to the positive electrode was changed to 4.5 V. The results are shown in the following Table 5. Meanwhile, in the present Example, the following organic additives J-1 to J-7 were used to confirm effects on the addition thereof.

TABLE 5

| No. | Compound <1> | Addition amount (mol/L) | Compound <2> | Addition amount (mol/L) | Cycling characteristic/ 300th cycle | 4C discharge efficiency/ 300th cycle |
|---|---|---|---|---|---|---|
| 501 | I-1 | 0.005 | — | — | 72 | 46.8 |
| 502 | I-7 | 0.08 | — | — | 70 | 43.4 |
| 503 | I-11 | 0.01 | — | — | 72 | 49.0 |
| 504 | I-14 | 0.005 | — | — | 75 | 48.8 |
| 505 | I-18 | 0.0025 | — | — | 78 | 54.6 |
| 506 | I-19 | 0.005 | — | — | 82 | 57.4 |
| 507 | I-26 | 0.006 | — | — | 79 | 56.9 |
| 508 | I-31 | 0.002 | — | — | 75 | 48.8 |
| 509 | I-34 | 0.002 | — | — | 81 | 55.9 |
| 510 | I-37 | 0.001 | — | — | 78 | 55.4 |
| 511 | I-1 | 0.005 | J-1 | 0.18 | 78 | 50.7 |
| 512 | I-7 | 0.08 | J-2 | 0.2 | 78 | 48.6 |
| 513 | I-11 | 0.01 | J-7 | 0.15 | 81 | 54.8 |
| 514 | I-14 | 0.005 | J-3 | 0.2 | 84 | 54.6 |
| 515 | I-18 | 0.0025 | J-3 | 0.1 | 86 | 60.2 |
| 516 | I-19 | 0.005 | J-5 | 0.15 | 85 | 59.5 |
| 517 | I-18 | 0.006 | J-4 | 0.2 | 88 | 63.7 |
| 518 | I-31 | 0.002 | J-6 | 0.15 | 84 | 54.6 |
| 519 | I-19 | 0.002 | J-3 | 0.2 | 91 | 62.6 |
| 520 | I-34 | 0.001 | J-2 | 0.15 | 87 | 62.0 |
| 521 | I-19 | 0.005 | J-2 | 0.2 | 84 | 54.8 |
| C51 | none | — | — | — | 42 | 21.8 |
| C52 | H-1 | 0.18 | — | — | 34 | 35.6 |
| C53 | H-1 | 0.15 | — | — | 31 | 42.3 |
| C54 | H-2 | 0.25 | — | — | 36 | 14.0 |
| C55 | H-2 | 0.02 | — | — | 37 | 45.6 |
| C56 | J-2 | 0.2 | — | — | 42 | 45.6 |

TABLE 5-continued

| | Compound <1> | Addition amount (mol/L) | Compound <2> | Addition amount (mol/L) | Cycling characteristic/ 300th cycle | 4C discharge efficiency/ 300th cycle |
|---|---|---|---|---|---|---|
| C57 | J-3 | 0.2 | — | — | 40 | 45.6 |
| C58 | J-4 | 0.2 | — | — | 38 | 45.6 |
| C59 | J-6 | 0.15 | — | — | 39 | 45.6 |
| C60 | I-1 | 0.15 | — | — | Charge failure | Charge failure |
| C61 | I-1 | 1 | — | — | Charge failure | Charge failure |
| C62 | I-1 | 5 | — | — | Charge failure | Charge failure |
| C63 | I-18 | 0.2 | — | — | Charge failure | Charge failure |

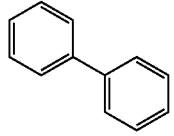

J-1

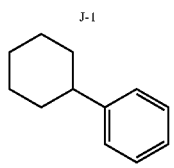

J-2

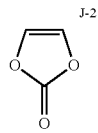

J-3

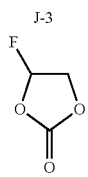

J-4

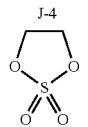

J-5

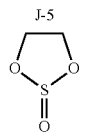

J-6

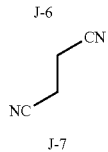

J-7

It is understood that the compounds of the present invention allow effective improvement of cycling characteristic by a very small addition amount thereof. On the other hand, the compounds for Comparative Examples cannot achieve such effect within this addition amount. From this comparison, superiority of the particular organometallic compound used in the present invention is apparent.

Further, it is understood that the organic additives of Comparative Examples cannot exhibit battery protection performances under the condition of such high voltage, but good performances are exhibited by a combination with the particular organometallic compound used in the present invention whereby further improvement in cycling characteristic can be achieved. It is thought that this is effects produced by the functions that SEI which is formed of the above-described particular organomettalic compound suppresses oxidative decomposition of organic solvent/electrolyte under the condition of such high voltage, and that the SEI suppresses excessive oxidative decomposition of the organic additives.

Example 6/Comparative Example 6

<Evaluation of Positive Electrode Thermal Stability>

The positive electrode was prepared by 85% by mass of lithium nickel manganese cobalt oxide ($LiNi_{1/3}Mn_{1/3}Co_{1/}$ $_3O_2$) as an active material, 7% by mass of carbon black as a conductivity aid, and 8% by mass of PVDF (poly fluorinated vinylidene) as a binder, and lithium was used as a negative electrode thereby to prepare a HS cell battery. CELGARD 2400 was used as a separator, and EC/EMC=½LiPF$_6$ 1 M was used as a liquid electrolyte.

The prepared HS cell battery was subjected to a DSC measurement after the following charging treatment thereby to evaluate a positive electrode thermal stability.

(Charging Treatment)

The HS cell battery produced by the method described above was used, and in a thermostatic chamber at 45° C., the battery was subjected to constant current charging at 0.2 C until the battery voltage reached 4.2 V at 0.8 mA, subsequently to charging at a constant voltage of 4.2 V until the current value reached 0.03 mA provided that the upper limit of the charging time of period was set at 14 hours. The battery was then subjected to constant current discharging at 1 C until the battery voltage reached 2.75 V at 2.8 mA. Then, these operations were repeated three times.

Next, 0.2 C constant current charge was conducted again at 0.8 mA in a thermostatic chamber at 45° C. until the battery voltage reached 4.2 V. The charge at the 4.2 V constant voltage was continued until the current value reached 0.03 mA thereby to complete the charging treatment provided that the upper limit of the charging time of period was set to 14 hours. After completion of the charging treatment, the HS cell battery was taken apart and punched out by a 30-puncher, and then stored in a sample bottle.

(DSC Measurement)

The taken positive electrode (approximately 1 mg) and liquid electrolyte (1 μl) were put into a SUS closed PAN under N$_2$ atmosphere, and swaged. The thus-prepared samples were subjected to a DSC measurement under the following conditions. The results were shown in Table 3.

Initial temperature: 25° C.; Rate of temperature increase: 10° C./min; End temperature: 500° C.

Preparation of Liquid Electrolyte

An EC/EMC=½LiPF$_6$ 1 M liquid electrolyte to which 0.001 M of additive 1-19 was added, was used. For Comparative Example, an EC/EMC=½LiPF$_6$ 1 M liquid electrolyte was used.

From the results shown above, it has been seen that when the particular organometallic compound according to the present invention is used, a positive electrode thermal stability is improved, and stabilization is found in terms of approximately 15° C. at the exothermic peak and 20° C. or more at the exothermic start temperature. From this, it is presumed that the particular organometallic compound of the present invention suppresses positive electrode thermal runaway at the time of overcharge of the battery. This effect indicates superiority of the present invention achieved by the additive containing an inorganic (metal) element which is different from conventional additives formed of only organic elements.

Having described our invention as related to the present embodiments, it is our intention that the invention not be limited by any of the details of the description, unless otherwise specified, but rather be construed broadly within its spirit and scope as set out in the accompanying claims.

This application claims a priority on Patent Application No. 2012-112750 filed in Japan on May 16, 2012, Patent Application No. 2012-143559 filed in Japan on Jun. 26, 2012, and Patent Application No. 2013-017276 filed in Japan on Jan. 31, 2013, each of which is entirely herein incorporated by reference.

REFERENCE SIGNS LIST

C Positive electrode (positive electrode mixture)
1 Positive electrode conductive material (current collector)
2 Positive electrode active material layer
A Negative electrode (negative electrode mixture)
3 Negative electrode conductive material (current collector)
4 Negative electrode active material layer
5 Non-aqueous liquid electrolyte
6 Operating means
7 Circuit wiring
9 Separator
10 Lithium ion secondary battery
12 Separator
14 Positive electrode sheet
16 Negative electrode sheet
18 Packaging can double as a negative electrode
20 Insulating plate
22 Opening sealing plate
24 Positive electrode current collector
26 Gasket
28 Pressure-sensitive valve body
30 Current blocking element
100 Bottomed cylindrical lithium secondary battery

The invention claimed is:

1. A non-aqueous secondary battery comprising:
a positive electrode containing a transition metal oxide as an active material thereof;
a negative electrode; and
a non-aqueous liquid electrolyte containing an electrolyte, an organic solvent, and less than 0.1 mol/L of an organometallic compound containing a transition element or a rare-earth element as a central metal thereof;
wherein the organometallic compound is a compound represented by any of the following formulae (Icp-1), (Icp-1'), (Icp-2) and (Icp-3), or a compound having a partial structure represented by the following formula (II):

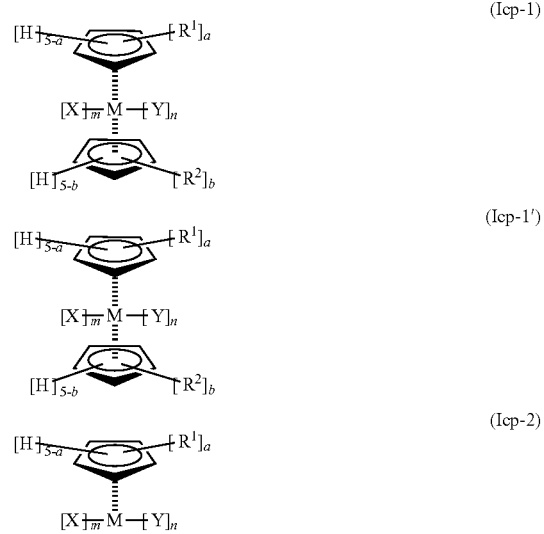

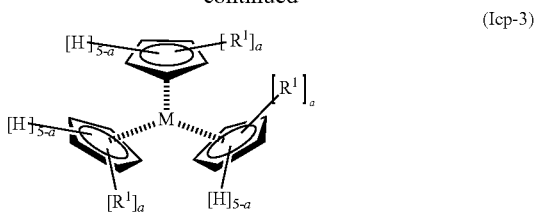

wherein, in formula (Icp-1), M represents a rare-earth element; in formula (Icp-1'), M represents a transition element selected from the group consisting of Ru, V, Ta, Mo, Ti and Zr; in formulae (Icp-2) and (Icp-3), M represents a transition element or a rare-earth element;

$R^1$ represents an alkyl group, an alkylsilyl group, an alkenyl group, an alkynyl group, an alkoxy group, a thioalkoxy group, an amino group, an amide group, an acyloxy group, a cyano group, a carboxyl group, a group containing a carbonyl group, a group containing a sulfonyl group, a phosphinyl group, or a halogen atom; $R^1$ may form an aliphatic ring or an aromatic ring;

$R^2$ has the same meaning as that of $R^1$;

a represents an integer from 0 to 5;

b represents an integer from 0 to 5;

X and Y each independently represent a hydrogen atom, an alkyl group, an alkenyl group, an alkoxy group, an alkylamino group, a silylamino group, a sulfonic acid group, an isocyanate group (NCO), an isothiocyanate group (NCS), a sulfanyl group, a phosphinyl group, a group containing a carbonyl group, a halogen atom, an aryl group, or a heteroaryl group; or X and Y may be linked to each other;

m and n are integers satisfying $0 \leq m+n \leq 3$ in the formulae (Icp-1), (Icp-2) and (Icp-3), and m and n are integers satisfying $0 < m+n \leq 3$ in the formula (Icp-1');

$$M\text{-}NR^3R^4 \quad \text{Formula (II)}$$

wherein M represents a transition element or a rare-earth element; $R^3$ and $R^4$ represent a hydrogen atom, an alkyl group, an alkenyl group, an alkynyl group, an aryl group, a heteroaryl group, an alkylsilyl group, or a halogen atom; and $R^3$ and $R^4$ may be linked to each other.

2. The non-aqueous secondary battery according to claim 1, wherein the compound having a partial structure represented by formula (II) is a compound represented by formula (IIa):

$$M\text{-}(NR^3R^4)_q \quad \text{Formula (IIa)}$$

wherein M, $R^3$ and $R^4$ have the same meanings as those in formula (II); and q represents an integer from 1 to 4.

3. The non-aqueous secondary battery according to claim 1, wherein the liquid electrolyte contains at least one selected from the group consisting of an aromatic compound, a nitrile compound, a halogen-containing compound, a phosphorus-containing compound, a sulfur-containing compound, a silicon-containing compound, and a polymerizable compound.

4. The non-aqueous secondary battery according to claim 1, wherein the positive electrode active material has a charge range in which the organometallic compound can be oxidized.

5. The non-aqueous secondary battery according to claim 1, wherein the positive electrode active material is a transition metal oxide which is able to interpolate or release an alkaline metal ion.

6. The non-aqueous secondary battery according to claim 1, wherein the material composed of the transition metal forming the positive electrode active material is a material containing $Li_gM3O_2$ (wherein M3 represents one or more of elements selected from Co, Ni, Fe, and Mn; and g represents from 0.02 to 1.2), or a material having a spinel structure represented by $Li_hM4_2O$ (wherein M4 represents Mn; and h represents from 0.02 to 2).

7. The non-aqueous secondary battery according to claim 1, wherein the positive electrode active material is lithium cobalt oxide, lithium manganese oxide, lithium nickel oxide, lithium nickel manganese cobalt oxide, nickel-cobalt-aluminum, lithium manganese nickel oxide, or lithium iron phosphate.

8. A non-aqueous liquid electrolyte for use in a non-aqueous secondary battery, the battery being provided with a positive electrode and a negative electrode, the positive electrode containing a material made of a transition metal oxide as an active material thereof;

the non-aqueous liquid electrolyte comprising an electrolyte, an organic solvent, and less than 0.1 mol/L of an organometallic compound;

the organometallic compound containing a transition element or a rare-earth element as a central metal thereof;

wherein the organometallic compound is a compound represented by any of the following formulae (Icp-1), (Icp-1'), (Icp-2) and (Icp-3), or a compound having a partial structure represented by the following formula (II):

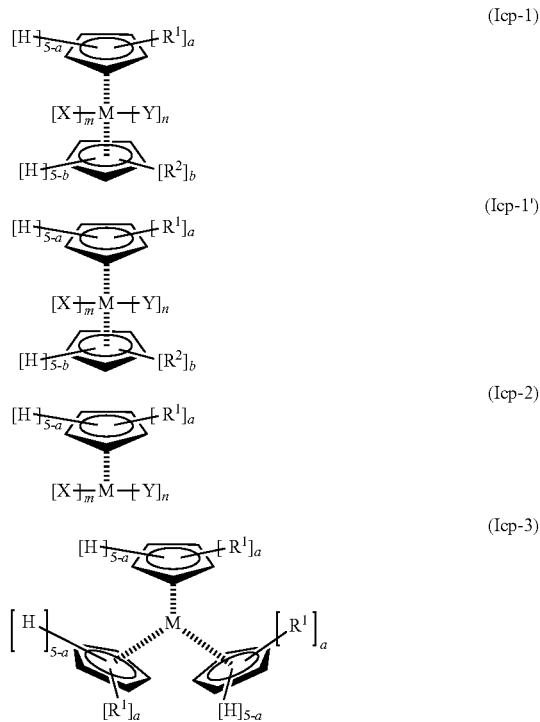

wherein, in formula (Icp-1), M represents a rare-earth element; in formula (Icp-1'), M represents a transition element selected from the group consisting of Ru, V, Ta, Mo, Ti and Zr; in formulae (Icp-2) and (Icp-3), M represents a transition element or a rare-earth element;

$R^1$ represents an alkyl group, an alkylsilyl group, an alkenyl group, an alkynyl group, an alkoxy group, a thioalkoxy group, an amino group, an amide group, an acyloxy group, a cyano group, a carboxyl group, a group containing a carbonyl group, a group containing a sulfonyl group, a phosphinyl group, or a halogen atom; $R^1$ may form an aliphatic ring or an aromatic ring;

$R^2$ has the same meaning as that of $R^1$;

a represents an integer from 0 to 5;

b represents an integer from 0 to 5;

X and Y each independently represent a hydrogen atom, an alkyl group, an alkenyl group, an alkoxy group, an alkylamino group, a silylamino group, a sulfonic acid group, an isocyanate group (NCO), an isothiocyanate group (NCS), a sulfanyl group, a phosphinyl group, a group containing a carbonyl group, a halogen atom, an aryl group, or a heteroaryl group; or X and Y may be linked to each other;

m and n are integers satisfying $0 \leq m+n \leq 3$ in the formulae (Icp-1), (Icp-2) and (Icp-3), and m and n are integers satisfying $0 < m+n \leq 3$ in the formula (Icp-1');

$$M\text{-}NR^3R^4 \quad \text{Formula (II)}$$

wherein M represents a transition element or a rare-earth element; $R^3$ and $R^4$ represent a hydrogen atom, an alkyl group, an alkenyl group, an alkynyl group, an aryl group, a heteroaryl group, an alkylsilyl group, or a halogen atom; and $R^3$ and $R^4$ may be linked to each other.

9. The non-aqueous liquid electrolyte for a secondary battery according to claim 8, containing at least one selected from the group consisting of an aromatic compound, a nitrile compound, a halogen-containing compound, a phosphorus-containing compound, a sulfur-containing compound, a silicon-containing compound, and a polymerizable compound.

10. An additive for a non-aqueous liquid electrolyte used for a non-aqueous secondary battery, the battery being provided with a positive electrode and a negative electrode, the positive electrode containing a material made of a transition metal oxide as an active material thereof, and the additive for a non-aqueous liquid electrolyte comprising an organometallic compound containing a transition element or a rare-earth element as a central metal thereof;

wherein the organometallic compound is a compound represented by any of the following formulae (Icp-1), (Icp-1'), (Icp-2) and (Icp-3), or a compound having a partial structure represented by the following formula (II):

 (Icp-1)

 (Icp-1')

 (Icp-2)

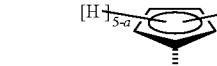 (Icp-3)

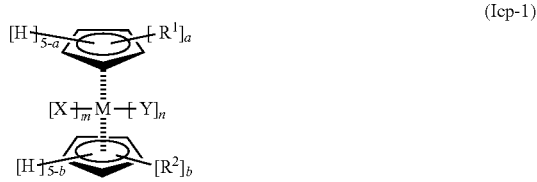

wherein, in formula (Icp-1), M represents a rare-earth element; in formula (Icp-1'), M represents a transition element selected from the group consisting of Ru, V, Ta, Mo, Ti and Zr; in formulae (Icp-2) and (Icp-3), M represents a transition element or a rare-earth element;

$R^1$ represents an alkyl group, an alkylsilyl group, an alkenyl group, an alkynyl group, an alkoxy group, a thioalkoxy group, an amino group, an amide group, an acyloxy group, a cyano group, a carboxyl group, a group containing a carbonyl group, a group containing a sulfonyl group, a phosphinyl group, or a halogen atom; $R^1$ may form an aliphatic ring or an aromatic ring;

$R^2$ has the same meaning as that of $R^1$;

a represents an integer from 0 to 5;

b represents an integer from 0 to 5;

X and Y each independently represent a hydrogen atom, an alkyl group, an alkenyl group, an alkoxy group, an alkylamino group, a silylamino group, a sulfonic acid group, an isocyanate group (NCO), an isothiocyanate group (NCS), a sulfanyl group, a phosphinyl group, a group containing a carbonyl group, a halogen atom, an aryl group, or a heteroaryl group; or X and Y may be linked to each other;

m and n are integers satisfying $0 \leq m+n \leq 3$ in the formulae (Icp-1), (Icp-2) and (Icp-3), and m and n are integers satisfying $0 < m+n \leq 3$ in the formula (Icp-1');

$$M\text{-}NR^3R^4 \quad \text{Formula (II)}$$

wherein M represents a transition element or a rare-earth element; $R^3$ and $R^4$ represent a hydrogen atom, an alkyl group, an alkenyl group, an alkynyl group, an aryl group, a heteroaryl group, an alkylsilyl group, or a halogen atom; and $R^3$ and $R^4$ may be linked to each other.

\* \* \* \* \*